(12) United States Patent
Srinivasan et al.

(10) Patent No.: US 6,895,382 B1
(45) Date of Patent: May 17, 2005

(54) METHOD FOR ARRIVING AT AN OPTIMAL DECISION TO MIGRATE THE DEVELOPMENT, CONVERSION, SUPPORT AND MAINTENANCE OF SOFTWARE APPLICATIONS TO OFF SHORE/OFF SITE LOCATIONS

(75) Inventors: Sriram Srinivasan, Danbury, CT (US); Hari D Garg, Basking Ridge, NJ (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 09/678,968

(22) Filed: Oct. 4, 2000

(51) Int. Cl.[7] .............................................. G06F 17/60
(52) U.S. Cl. ................................................ 705/7; 705/1
(58) Field of Search ............................... 705/7, 1, 8, 9, 705/10

(56) References Cited

U.S. PATENT DOCUMENTS 6,615,166 B1 * 9/2003 Guheen et al. ............... 703/27

FOREIGN PATENT DOCUMENTS

EP    WO 99/46692   *   9/1999   ........... G06F/17/00

OTHER PUBLICATIONS

Doherty, Sean, "pcAnywhere Process Next Best Thing—Can't be there? Symantec pcAnywhere's management console and SNMP support make it the best remote control package for large sites", Feb. 7, 2000, Network Computing, p73.*

* cited by examiner

Primary Examiner—Tariq R. Hafiz
Assistant Examiner—Akiba Robinson-Boyce
(74) Attorney, Agent, or Firm—Anthony V. S. England; T. Rao Coca

(57) ABSTRACT

This invention relates to a method for implementing an off shore/off site activity in an organization, with most optimal skills transfer process. The said process includes the steps of assessing the suitability of outsourcing and whether the activity should be carried out on-site, locally or remotely, based on pre-determined parameters and decision ratios, planning the process including the minimum groundwork required before the actual process can begin, identifying the various milestones in the process and the deliverables in each milestones monitoring the progress of the migration process and the ways and means to take corrective action, and, evaluating the results of the development.

6 Claims, 11 Drawing Sheets

A: MONITORING PROGRESS

A. During transition

B. DURING STEADY STATE

Problem Summary: Provides information about the number of problems opened during the period and number of problems closed during the same period.

Open Problem Summary - 1: Provides information about the number of problems which are open at thea end of every week — including problems currently active, backlogs and those that have been deferred.

Open Problem Summary - 2: This graph provides a severity wise break down of Open, Backlog and Deferred problems for the current month.

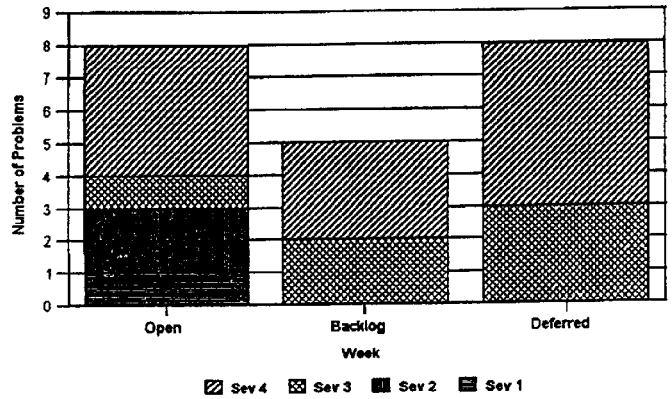

Figure 9

Errors by Function: Breaks down the reported problems into application functions and severity such that it is possible to determine which features/facilities/functions are more error prone and thus enables root cause analysis. It is also indicative of the quality of code per function.

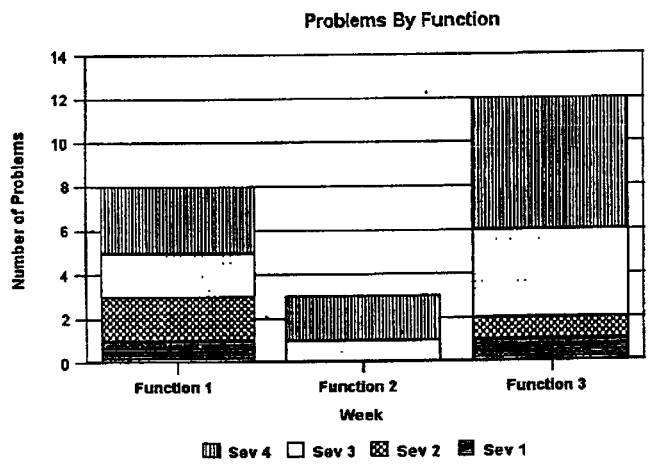

Figure 10

Time to Acknowledge: This is the elapsed time between when an error is raised by the client and its acknowledgement by the support team.

Ageing Analysis: Provides details of open problems at 2 levels.

II.  Problems currently open

III. Problems open beyond SLA

The graph measures the support team's performance as well as provides information on whether the team size needs to be changed.

Problems Re-opened: A problem can be reopened either at the system test stage or by the end-user. It therefore indicates the quality of work performed. It shows the number of errors, by severity, that have been reopened.

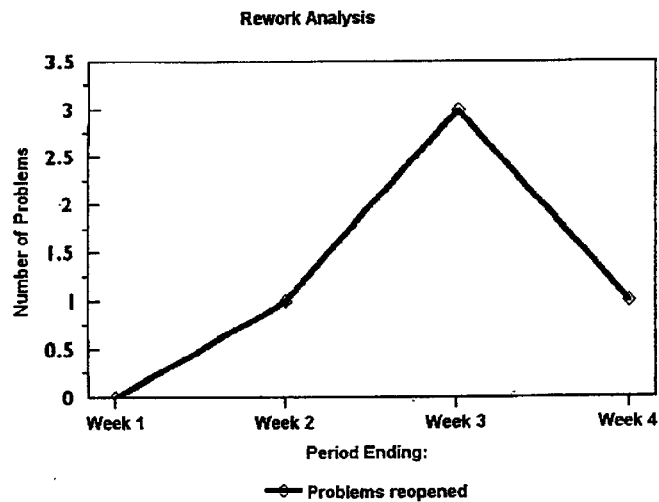

Figure 13

Accuracy of Estimation: Compares how close the actual effort expended in fixing an error is to the original estimate and is a valuable indication of the level of application knowledge within the team. The numbers are depicted by severity, as a percentage variation from the original estimate.

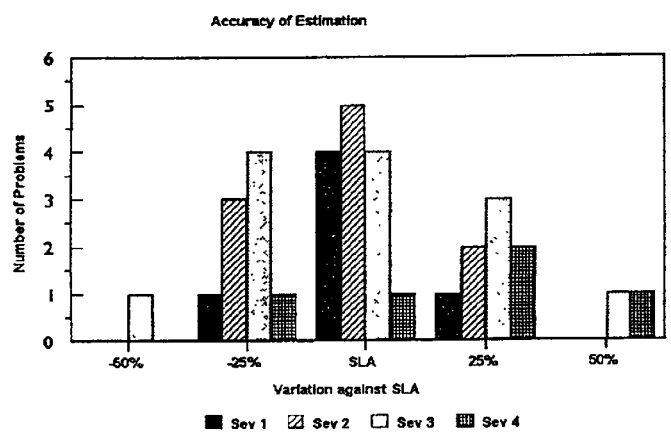

Figure 14

Maintenance Productivity: Indicates how the skills level in the team is improving, with respect to the more experienced former team members. It is expressed as the average number of hours required to close a problem (irrespective of the severity) over a period of time. It can be computed by dividing the total effort expended to close errors by the number of errors, i.e. hours per error closed.

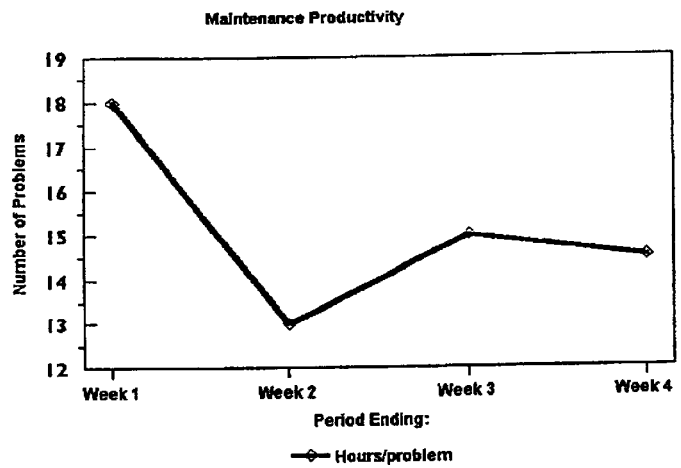

Figure 15

Resource Loading: Indicates the expended effort compared to the budgeted effort. It is a function of productivity and inflow of work.

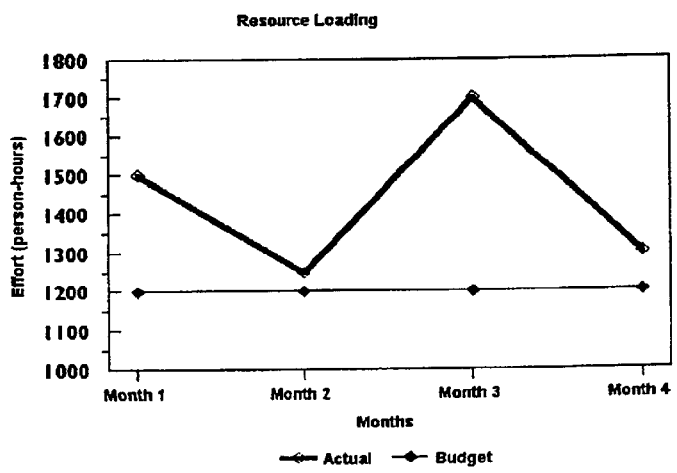

Figure 16

METHOD FOR ARRIVING AT AN OPTIMAL DECISION TO MIGRATE THE DEVELOPMENT, CONVERSION, SUPPORT AND MAINTENANCE OF SOFTWARE APPLICATIONS TO OFF SHORE/OFF SITE LOCATIONS

FIELD OF THE INVENTION

This invention relates to a method for arriving at an optimal decision to migrate the development, conversion, support and maintenance of software applications to off shore/off site locations to gain advantages of lower costs and significantly larger skill pools with equivalent or higher quality of service.

Off shore normally refers to a remote location in another country other than the country where the software application currently resides.

Off site normally refers to another location in the same country (other than the site where the software application currently resides, which is also referred to as on site).

BACKGROUND OF THE INVENTION

With a constant focus on the desire to decrease operating costs fueled in part by an increasing demand for qualified IT skills, there is pressure within today's corporate world to move the development, support and maintenance of software (Applications Development and Maintenance—also referred to as AD/M) to alternate locations, where the advantages of lower costs and significantly larger skills pools can be leveraged without sacrificing the quality of service provided.

The main catalysts that promote this kind of thinking are
improvements in communication technology bringing down the traditional barriers of distance
the availability of adequately IT skilled resources in global geographies
the urgent need to re deploy hard-to-obtain subject matter experts (SMEs) on other core projects or new business areas such as e-business and process reengineering
demands by the customer on the IT infrastructure to continually reduce development cycle times, thereby increasing the 'speed to market.

As of now there is no single comprehensive method or process available that allows for a foolproof decision making system that identifies the problem areas to achieve maximum success rate. It is more of a 'hit-or-miss' situation.

THE OBJECTS AND SUMMARY OF THE INVENTION

The object of this invention is therefore to provide a framework:
to help in decision making from the time a decision is made to utilize an alternate location (which could be remote)
to objectively enable the selection of appropriate applications; and
to finally manage the actual transition itself.

A finely tuned process incorporating checks and balances at key points needs to be followed to ensure that:
the choice of applications is appropriate
distance is not perceived to be a limiting factor
the effort is as seamless as possible from the end-user's perspective
the business knowledge is transitioned methodically and comprehensively within a given period and to a plan
the cost of the transition does not erode into the original business case
to the extent possible, all risks are identified in advance and mitigation strategies put in place to cover such risks as inadequate (or even non existent) product documentation, employee turnover and unplanned peaks in work load during the skills transfer.

To achieve said objectives, this invention provides a method for implementing an off shore/off site activity in an organization, with most optimal skills transfer process comprising the steps of:
assessing the suitability of outsourcing and whether the activity should be carried out onsite, locally (off site) or remotely (off shore), based on pre-determined parameters and decision ratios,
planning process including the minimum groundwork required before the actual process can begin,
identifying the various milestones in the process and the deliverables in each milestone
monitoring the progress of the migration process and the ways and means to take corrective action, and,
evaluating the results of the development.

The off shore/off site activity can relate to
development of a new project system, or
conversion from existing project system to new project system, or
maintenance of the existing project system.

The phases for the development of a new project system comprise of:
evaluating the requirements in respect of:
    structured interviews with the staff of the organization
    system interface
    cost/benefit analysis and project objectives
analyzing the said requirements using:
    logical data model
    process model function
    prototyping and
    developing project plans and standards
developing high level system design such as:
    type of hardware used
    data dictionary required
    type of operating system (OS)
    system interface
    type of application software or user interface
developing low level system design, namely
    physical database,
    module specifications
    sub-programs and test plans
development of program specification, namely
    program code,
    verification and validation of the test data, and
    link and system test
acceptance using verification test for functional interface verification, stress test and performance test, and
documenting and user training after acceptance.

The evaluation requirement is carried out 90–100% on site, 70–90% of which is in-house and 30–10% is outsourced.

The evaluation requirement is optimally carried out 100% on site, 80% of which is in-house and 20% is outsourced.

Analysis of the requirements is 90–100% on site and the experts conducting the analysis are 40–60% from in-house and 60–40% are outsourced.

Analysis of the requirements is 100% on site and the experts conducting the analysis optimally are 50% from in-house and 50% are outsourced.

The high level system design development is carried out by 40–60% on site and 60–40% at remote location.

The high level system design development is optimally carried out by 50% on site and 50% at remote location.

The high level system design development is carried out 40–60% in-house and 60–40% is outsourced.

The high level system design development is optimally carried out 50% in-house and 50% is outsourced.

The low level system design development is carried out 40–60% on site and 60–40% remote.

The low level system design development is optimally carried out 50% on site and 50% remote.

The low level system design development is carried out 15–35% in house and 85–65% is outsourced.

The low level system design development is optimally carried out 25% in house and 75% is outsourced.

The development of program specification, program code, verification and validation (V&V) test and link and system test are carried out 10–30% on site and 90–70% at remote location.

The development of program specification, program code, verification and validation (V&V) test and link and system test are optimally carried out 20% on site and 80% at remote location.

The said development is carried out 0–20% in-house and 100–80% is outsourced.

The said development is optimally carried out 10% in-house and 90% is outsourced.

Acceptance of the project is carried out 20–40% on site and 80–60% at remote location.

Acceptance of the project is optimally carried out 30% on site and 70% at remote location.

The said acceptance of the project is carried out 10–30% in-house and 90–70% is outsourced.

The said acceptance of the project is optimally carried out 20% in-house and 80% is outsourced.

The documentation and training is carried out 70–90% on site and 30–10% on remote location.

The documentation and training is optimally carried out 80% on site and 20% on remote location.

The documentation and training is carried out 20–40% in-house and 80–60% is outsourced.

The documentation and training is optimally carried out 30% in-house and 70% is outsourced.

The conversion from existing project system to a new project system comprising:
  analyzing the requirements by
    defining source and target environment
    defining data structure
    analysing job steps,
    defining strategy for conversion tools
    defining strategy for hardware and software variation including special interface and data and archive migration
    defining change and control process and incremental change mechanism
  developing pilot project by:
    selection of pilot program
    generating test data for pilot program
    conducting pilot reference runs
    verifying reference runs results, and,
    updating conversion guide
  generating test data by:
    finalizing test data points
    freezing and archiving production code
    generating test data using reference runs, and
    verifying reference run results
  converting existing system to new system by:
    converting of common routines
    converting of source codes
    converting of job control units, and
    verifying and validating unit tests
    comparing results with test data
    defining data migration programs
  acceptance of new system by
    verifying functional equivalence
    verifying interfaces
    conducting stress tests
    conducting performance test
    verifying data migration programs
  post acceptance phase including
    user training
    defining cutover strategy
    implementing incremental changes
    data transfer
    conducting parallel runs, and
    implementing cutover The analysis is carried out on site, 90–100%, with of the said analysis is 70–90% in-house and 30–10% is outsourced.

The analysis is optimally 100% on site with 80% of the said analysis is in-house and 20% is outsourced.

The development of the pilot program is 40–60% on site and 60–40% at remote location while the experts are 40–60% from in-house and 60–40% are outsourced.

The development of the pilot program is optimally 50% on site and 50% at remote location while the experts are 50% from in-house and 50% are outsourced.

The said test data development is carried out 80–100% on-site and 20–0% at remote location.

The said test data development is optimally carried out 90% on-site and 10% at remote location.

The said test data development is carried out 40–60% in-house and 60–40% is outsourced The said test data development is optimally carried out 50% in-house and 50% is outsourced.

The said conversion from the existing system to new system is carried out 0–20% on-site and 100–80% at remote location.

The said conversion from the existing system to new system is optimally carried out 10% on-site and 90% at remote location.

The said conversion from the existing system to new system is carried out 15–35% in-house and 85–65% is outsourced.

The said conversion from the existing system to new system is optimally carried out 25% in-house and 75% is outsourced.

The said acceptance of the new system is carried out 50–70% on-site and 50–30% at remote location.

The said acceptance of the new system is optimally carried out 60% on-site and 40% at remote location.

The said acceptance of the new system is carried out 15–35% in-house and 85–65% is outsourced.

The said acceptance of the new system is optimally carried out 25% in-house and 75% is outsourced.

The said post-acceptance of the new system is carried out 70–90% on-site and 30–10% at remote location The said post-acceptance of the new system is optimally carried out 80% on-site and 20% at remote location.

The said post-acceptance of the new system is carried out 30–50% in-house and 70–50% is outsourced.

The said post-acceptance of the new system is optimally carried out 40% in-house and 60% is outsourced.

The said maintenance of the existing project system comprises:

Planning
   project selection and formation of transition management team
   definition of the scope of the environment, service level agreements, backlog and team size
   definition of skills and levels, and
   preparation of staffing plan
   cost benefit analysis and business case
   skills gap analysis and incremental training
   professional counselling for displaced staff knowledge transfer
   overview, architecture, standards and procedures
   classroom training and updating of documentation
   documentation of project inventory
   assessment of team skills and tutor skills
   definition of support strategy and infrastructure
   identification team members and composition managed perform
   work on low priority errors/enhancements under close supervision
   assessing level and quality of skills transfer
   production maintenance and enhancement with management supervision
   definition of support procedures/processes and cutover strategy
   definition production and Quality Assessment measurement criteria assisted perform
   shared production support
   shifting of development work to remote location
   implementing new support strategy such as change control, call handling mechanism, end-user interfaces, communication channels and cutover
   checkpoint review with end user staff cutover & steady state
   transferring project management control
   optimising ADM processes
   identifying critical resources and develop backup staff plan
   optimising skills pool by cross training
   considering possible mission transfer The planning is carried out 80–100% on site and 20–0% remote.

The planning is optimally carried out 90% on site and 10% remote.

The planning is carried out 60–80% in house and 40–20% is outsourced.

The planning is optimally carried out 70% in house and 30% is outsourced.

The knowledge transfer is carried out 80–100% on site and 20–0% remote.

The knowledge transfer is optimally carried out 90% on site and 10% remote.

The knowlegde transfer is carried out 40–60% in house and 60–40% is outsourced.

The knowlegde transfer is optimally carried out 50% in house and 50% is outsourced.

The managed perform is carried out 80–100% on site and 20–0% at remote location.

The managed perform is optimally carried out 90% on site and 10% at remote location.

The managed perform is carried out 20–40% in house and 80–60% is outsourced.

The managed perform is optimally carried out 30% in house and 70% is outsourced.

The assisted perform is carried out 15–35% on-site and 85–65% at remote location.

The assisted perform is optimally carried out 25% on-site and 75% at remote location.

The assisted perform is carried out 5–25% in house and 75–95% is outsourced.

The assisted perform is optimally carried out 15% in house and 85% is outsourced.

The cutover and steady state is carried out 15–35% on-site and 65–85% remote.

The cutover and steady state is optimally carried out 25% on-site and 75% remote.

The cutover and steady state is 90–100% outsourced.

The cutover and steady state is optimally 100% outsourced.

The assessment and suitability of an application for migration off shore/off site is based on weightage given to selection parameters viz.

Skill type
   Skill availability
   Project/Application type
   Project position in life cycle
   Rapid Application Development (RAD) and/or Joint Application Development (JAD)
   Clarity of scope
   Local third party involvement
   Project size
   Mission critical
   Miscellaneous constraints
   Cost savings The said weightage is calculated by multiplying the Hari-Sriram (H-S) score for each of said selection parameters with a normalizing factor, Hari-Sriram Multilplier.

The said Hari-Sriram (H-S) score is in a range of 1 to 10.

The said normalizing factor is Hari-Sriram (H-S) Multiplier.

The said cumulative weightage for selection parameters are:

01–20 In-house, no outsourcing
   20–30 Local (off site), not remote (off shore)
   30–40 Predominantly local, with remote on a case by case (75:25)
   40–60 a mix of on-site and remote locations
   60–100 Predominantly remote (including mission/project management transfer), with some on-site (80:20)

BRIEF DESCRIPTION OF THE DRAWINGS

The invention will now be described in general with reference to the accompanying drawings and examples.

FIGS. 7 to 16 shows graphs illustrating Example IV for monitoring the quality of service provided during steady state.

DETAILED DESCRIPTION OF THE DRAWINGS

Figure 1:
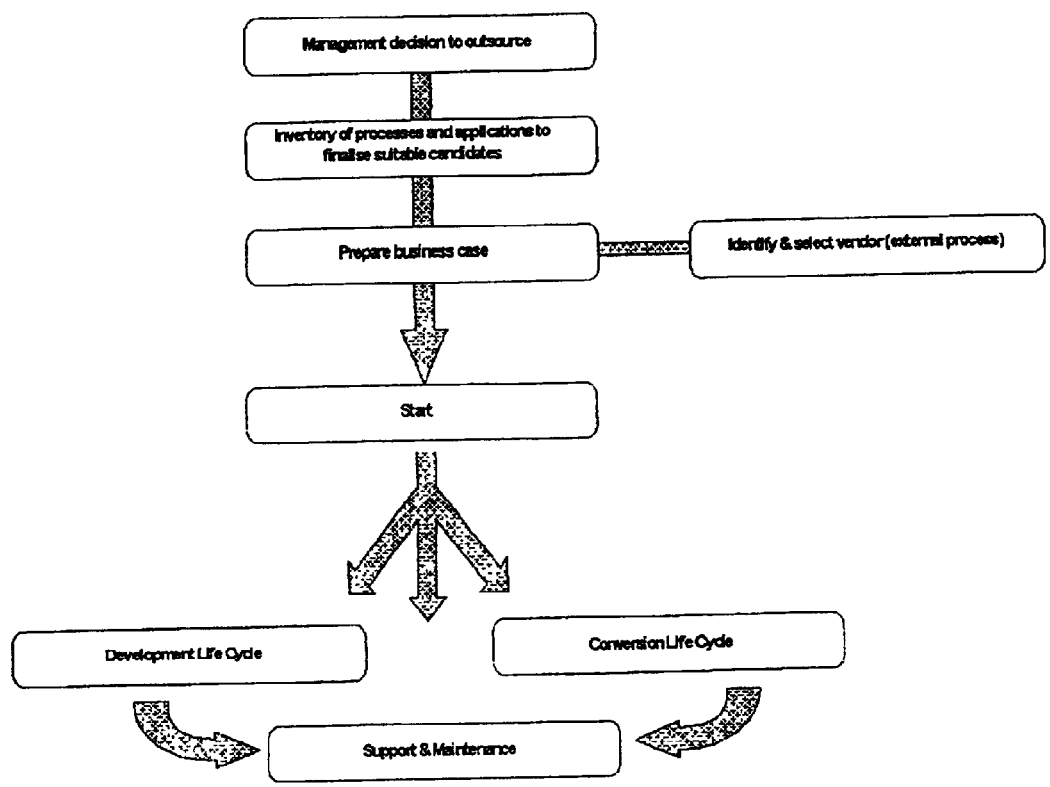
FIG. 1 shows typical outsourcing life-cycle

FIG. 1 shows the Typical Outsourcing Life-Cycle. The figure outlines the flow of activities that take place once the management has decided to outsource. The figure depicts the stages in the order of taking an inventory of processes and applications to finalize suitable candidates, followed by preparing business case before starting the selected development activity. The process of preparing a business case includes identification and selection of vendor which is essentially an external process.

Figure 2:
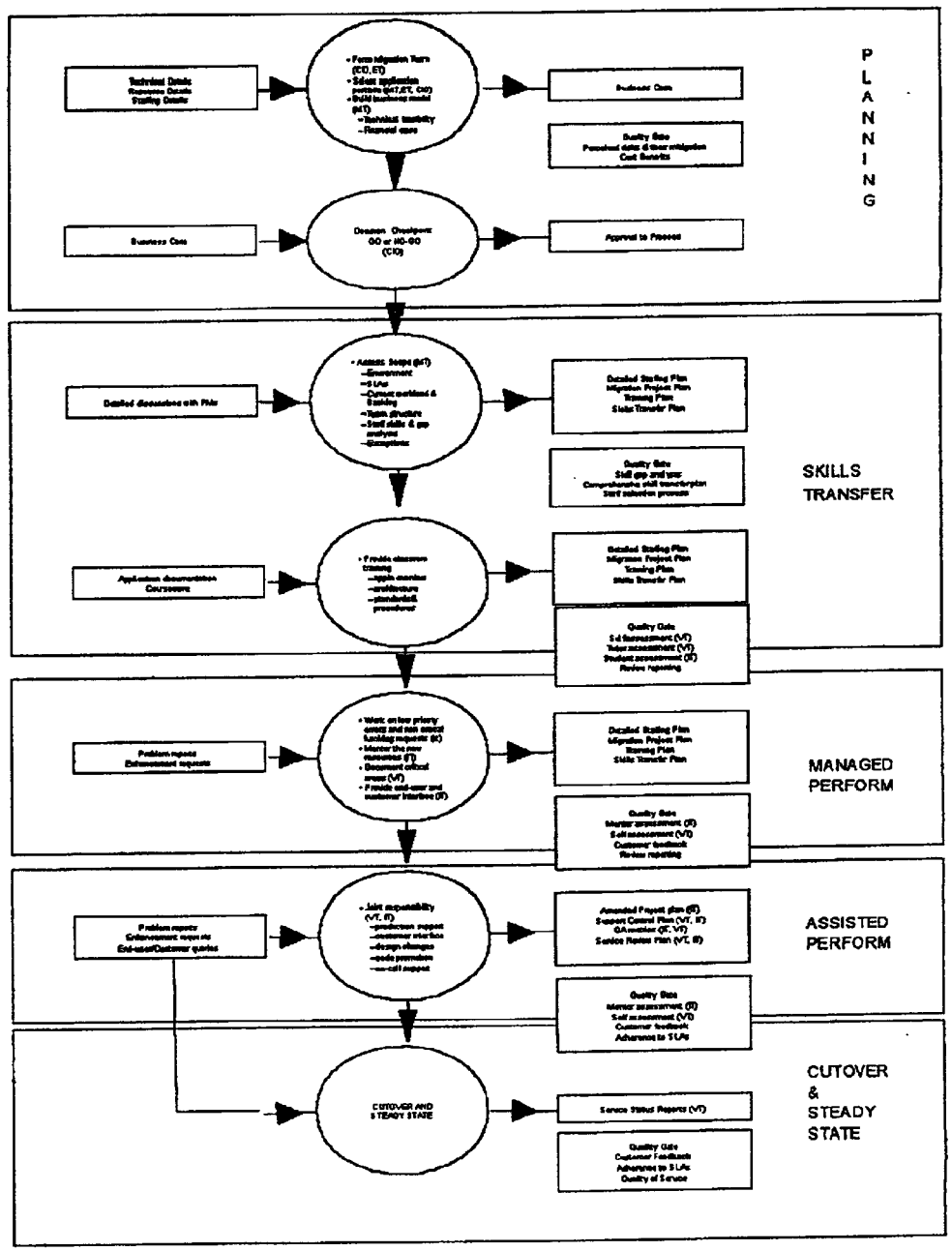
FIG. 2 depicts a typical process flow to achieve the project milestones of a maintenance life cycle.

FIG. 2 shows the Milestones in a Support and Maintenance Life Cycle comprising of Planning, skilled transfer, Assisted perform, Managed Perform and Cutover and Steady State.

All activities are as explained hereinafter in detail.

Figure 3A:
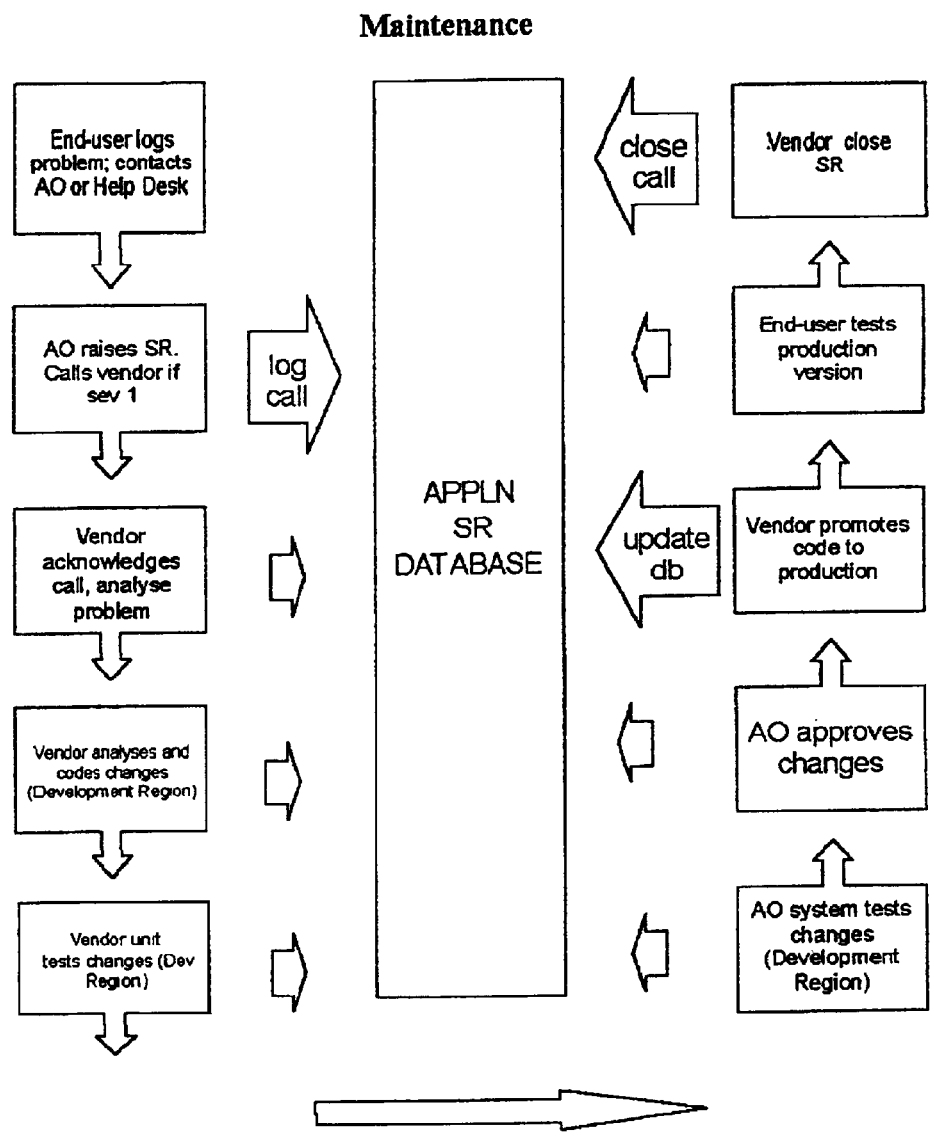
FIGS. 3a & 3b show a flow chart with regard to Maintenance in a process flow and Enhancements in process flow respectively.

FIG. 3a shows the workflow in a support system, from the time an error is reported to the time it is corrected, promoted to the production system and the error report is closed.

Figure 3B:
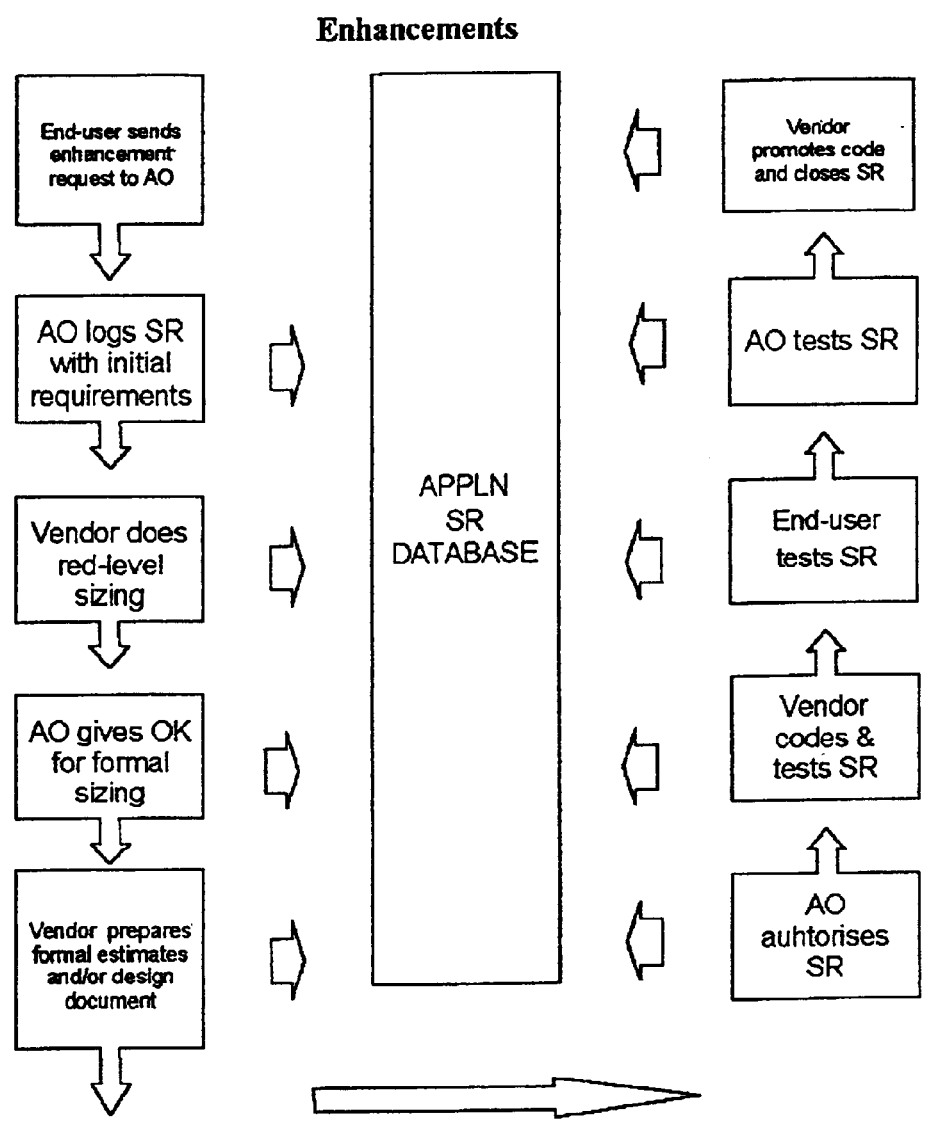

FIG. 3b shows similar requirements while effecting enhancements to the application, per user requests.

Figure 4:
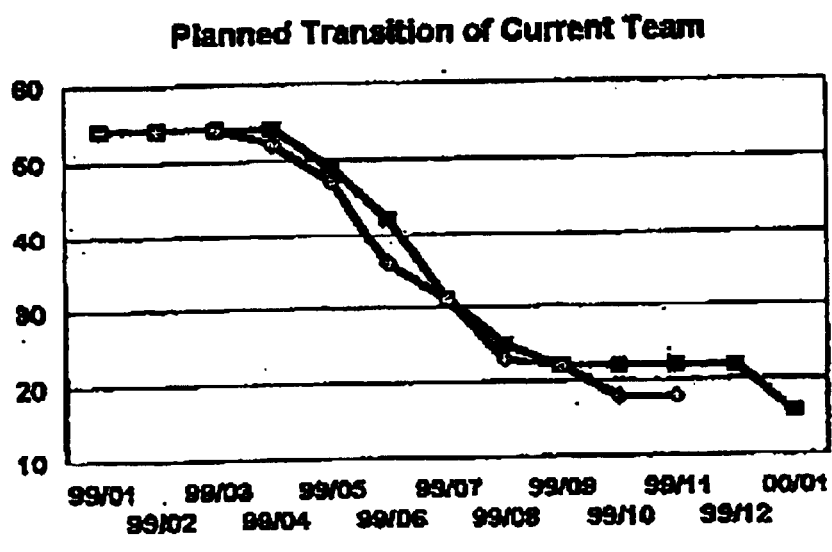
FIGS. 4 to 6 shows graphs illustrating Example IV for monitoring progress during transition state
Figure 5A:
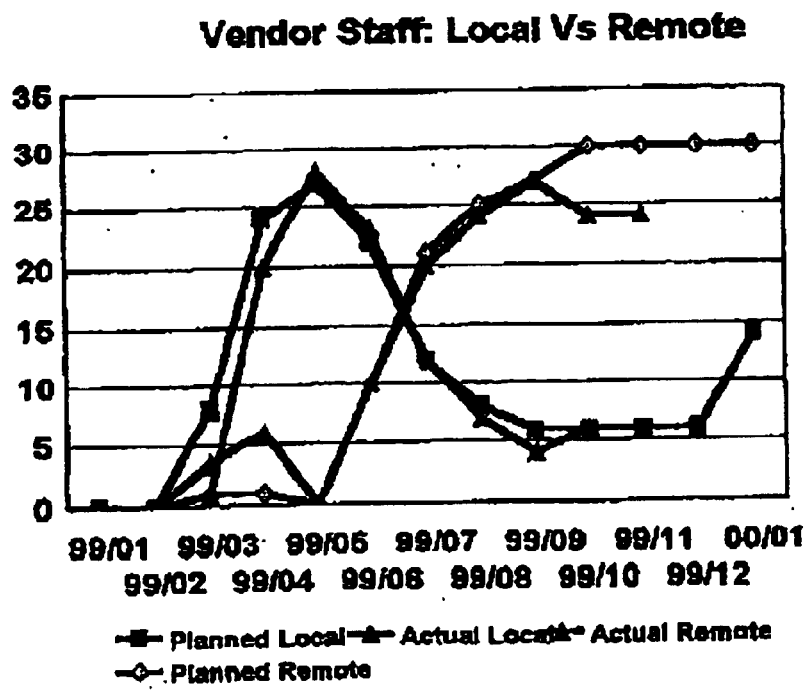
Figure 5B:
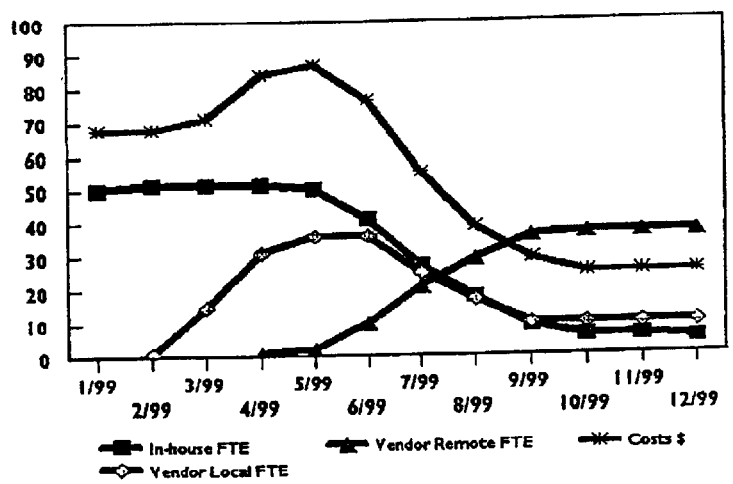
Figure 6:
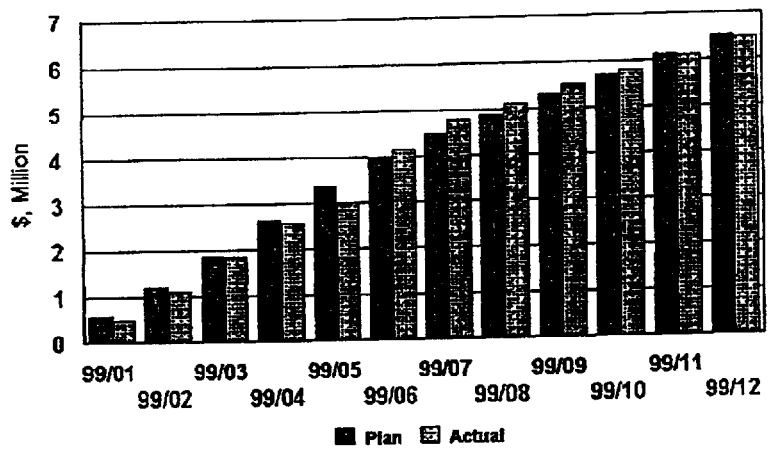

FIGS. 4 to 6 deals shows how the progress (or lack of it), during the various stages of the knowledge transition in a maintenance lifecycle, can be monitored such that any variations against budgeted plans can be easily brought to the management's notice.

FIG. 4 tracks the actual transition (ramp down) of the in-house team against plan during the knowledge transition phase (assumed to be a period of 12 months). Similarly, FIGS. 5a and 5b depict the deployment (i.e. ramp up) of vendor staff (local Vs remote) for the same period. FIG. 6 shows the graph comparing planned cost as against actual cost incurred during this period of knowledge transition.

FIGS. 7 to 16 measure the performance of the vendor team against pre-set goals (or Service Levels).

Figure 7:
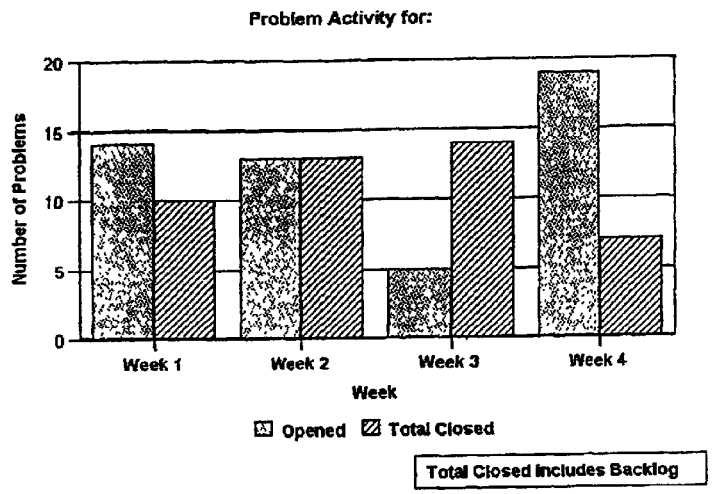

FIG. 7 shows summary of the number of problems opened during the period and number of problems closed during the measurement period.

Figure 8:
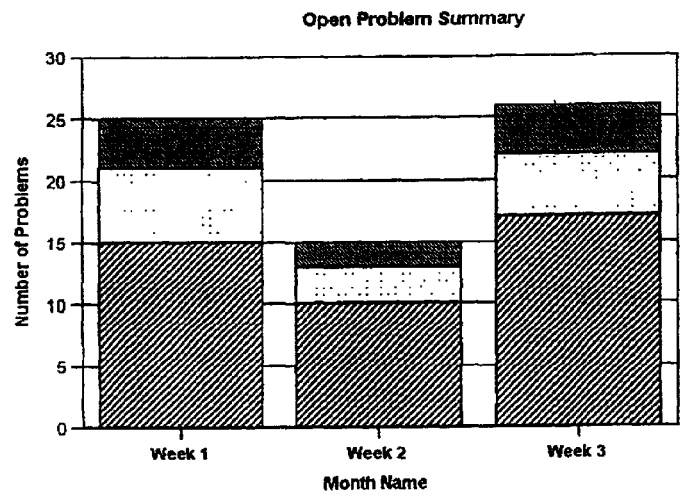

FIG. 8 shows summary of the number of problems which are open at the end of every week, classified by severity (Sev 1=urgent Sev 4=cosmetic change). FIG. 9 shows summary of severity wise break down of open, Backlog and Deferred problems for the current month, again by severity FIG. 10 shows summary of Breakdown of reported problems into application functions and severity to determine which features/facilities/functions are more error prone and enables root cause analysis.

Figure 11:
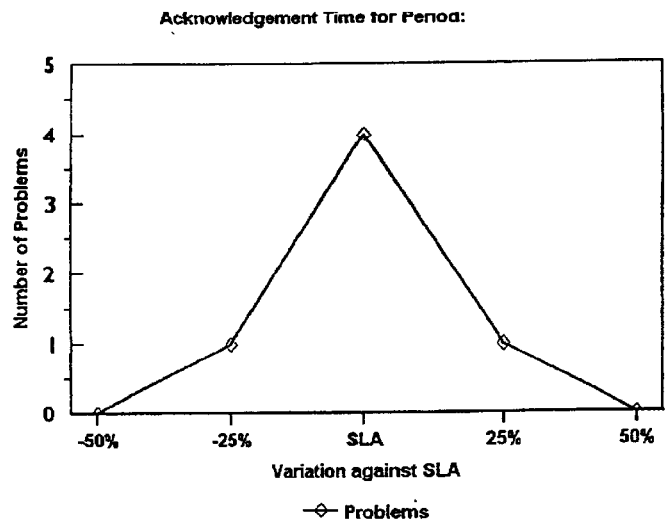
Figure 12:
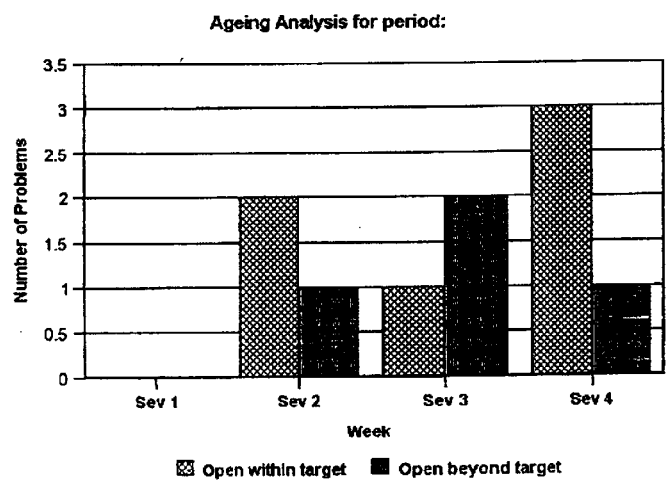

FIG. 11 shows time elapsed between when an error is raised by a client and its acknowledgement by the support team FIG. 12 shows graph measuring the support team's performance besides providing information on whether the team size needs to be increased or decreased (over work/underwork)

FIG. 13 is indicative of the quality of code fixes as well as the testing. Optimally, there should be zero rework FIG. 14a illustrates the subject matter expertise available within the current team. It tracks the variation between the estimated effort and actual effort.

FIG. 15 Indicates the time/effort required to close errors and the gain in productivity over time, regardless of severity.

FIG. 16 shows a graph that indicates the expended effort for resource loading as compared to the budgeted effort. This is a function of productivity and inflow of work.

Project Types

For purposes of process clarity, the following project types are defined

1. Development: Where an application (or suite of applications) is to be built from scratch, based on pre-defined requirements, i.e. 'waterfall' method
2. Conversion: Where an existing application (or suite of applications) is to be migrated from one platform to another. The source and target platforms may include any combination of the following variables 1 Hardware (IBM S/390, RS 6000 etc)
2 Operating system (MVS, AIX, Windows etc)
3 Application development environment (COBOL, PL/1, C etc)

1. Support and Maintenance: Where the daily production support of and enhancements to an existing application (or suite of applications) is to be moved from one team at a location to another team at a new location. It is assumed that whilst the new team has the basic platform skills, it has very basic/no knowledge of the application itself or the underlying business process.

Selection criteria: It is very important to assess a business process or application to determine whether it can be developed or supported (i.e. outsourced) from a remote location. To help in the decision making process, it is useful to start at a high level with a set of basic assumptions and then drill down; at each lower level, more specific questions can be asked to validate the original assumptions. Selection Attributes are given in Table 1 titled Selection Factors and Parameters

TABLE 1

Selection Factors and Parameters

| Driving Factor/ | Location | | | Hari-Sriram |
| --- | --- | --- | --- | --- |
| Parameter | In-house | Local | Remote | Multiplier |
| 1. Skills | | | | |
| Type | Current 'hot' skills: Java, Internet, GUI Project/Contract Management (0–4) | Supplement in-house requirement (3–7) | Legacy, obsolete, old technology Latest/Cutting edge (too new) (4–10) | 1 |
| Availability | Limited requirement (0–4) | Limited requirement (3–6) | Large numbers, quick ramp-up Scarce locally (3–10) | 2 |

TABLE 1-continued

Selection Factors and Parameters

| Driving Factor/ Parameter | Location | | | Hari-Sriram Multiplier |
|---|---|---|---|---|
| | In-house | Local | Remote | |
| 2. Project | | | | |
| Type | High business functionality (0–3) | Data conversion Client/Server maintenance for domestic clients Customise locally procured product for domestic market (3–6) | Legacy support Client/Server maintenance for foreign clients Tools development Conversion, migration, porting Reengineering Rightsizing Turnkey customisation Customise/enhance product for foreign market Data entry Help desk (5–10) | 0.8 |
| Position in system life cycle | Requirements High level design Implementation (0–3) | High level design Low level design Interactive, integration testing Implementation Performance tuning (3–7) | Low level design Systems architecture Coding Testing (5–10) | 0.4 |
| RAD/JAD development component | High (0–1) | Medium (1–5) | Medium to low, review case to case (5–10) | 0.2 |
| Specifications, clarity of scope, availability of documentation | Low (0–1) | Medium (3–7) | High (5–10) | 0.6 |
| Team organisation (3rd party involvement) | High (0–5) | Low (0–5) | Low (5–10) | 0.2 |
| Size | Small (0–2) | Small (2–5) | Medium to large (4–10) | 0.8 |
| 3. Business Constraints | | | | |
| Mission critical, real time system, 24 × 7 support, to be sunset | High (0–3) | Split severity level/team location (3–7) | Split severity level/ team location (6–10) | 0.6 |
| Other constraints (legal, security, liability, IPC) | High (0–5) | Review case to case (5–10) | Review case to case and location to location (8–10) | 0.4 |
| 4. Costs | | | | |
| Requirement to save cost | Low (0–2) | Low (0–5) | Medium to High (3–10) | 0.3 |
| Cumulative weightage range (Hari-Sriram Score* Hari-Sriram Multiplier) | 0–30 | 20–60 | 40–100 | |

Note: Figures in parentheses (Hari-Sriram Score: $H-S_{Score}$, $H-S_{Min}$, $H-S_{Max}$) indicate the suggested relative scoring on a scale of 0–10 for each of the attributes; Hari-Sriram Multiplier is the suggested normalising factor

TABLE 2

Weightage for Selection Parameters

| | IH | | | | Local | | | | Rem | | | | H-S |
|---|---|---|---|---|---|---|---|---|---|---|---|---|---|
| Parameters | H-S$_{Min}$ | H-S$_{Max}$ | Wtd Min | Wtd Max | H-S$_{Min}$ | H-S$_{Max}$ | Wtd Min | Wtd Max | H-S$_{Min}$ | H-S$_{Max}$ | Wtd Min | Wtd Max | Multiplier |
| Skill Type | 0 | 4 | 0 | 4 | 3 | 7 | 3 | 7 | 4 | 10 | 4 | 10 | 1 |
| Skill Availability | 0 | 4 | 0 | 8 | 3 | 6 | 6 | 12 | 3 | 10 | 6 | 20 | 2 |
| Project/Application Type | 0 | 3 | 0 | 2.4 | 3 | 6 | 2.4 | 4.8 | 5 | 10 | 4 | 8 | 0.8 |
| Project position in Life Cycle | 0 | 3 | 0 | 1.2 | 3 | 7 | 1.2 | 2.8 | 5 | 10 | 2 | 4 | 0.4 |
| RAD/JAD development component | 0 | 1 | 0 | 0.2 | 1 | 5 | 0.2 | 1 | 5 | 10 | 1 | 2 | 0.2 |
| Specs/clarity of scope | 0 | 3 | 0 | 1.8 | 3 | 7 | 1.8 | 4.2 | 5 | 10 | 3 | 6 | 0.6 |
| Local third party involvement | 0 | 5 | 1 | 1 | 0 | 5 | 0 | 1 | 5 | 10 | 1 | 2 | 0.2 |
| Project size | 0 | 2 | 0 | 1.6 | 2 | 5 | 1.6 | 4 | 4 | 10 | 3.2 | 8 | 0.8 |
| Mission critical | 0 | 3 | 0 | 1.8 | 3 | 7 | 1.8 | 4.2 | 6 | 10 | 3.6 | 6 | 0.6 |
| Other constraints | 0 | 5 | 0 | 2 | 5 | 10 | 2 | 4 | 8 | 10 | 3.2 | 4 | 0.4 |
| Cost savings | 0 | 2 | 0 | 6 | 0 | 5 | 0 | 15 | 3 | 10 | 9 | 30 | 3 |
| Cumulative Weightage | | | 0 | 30 | | | 20 | 60 | | | 40 | 100 | 10 |

Note:
Weighted minimum or maximum per location = (H-S$_{Min}$ or H-S$_{Max}$) * H-S Multiplier Interpretation 1. Table 1 is essentially a matrix containing the various 'common issues' (or attributes) that will impact the decision to outsource, e.g. required cost savings, business constraints etc
2. Every attribute (i.e. row) is either a driving factor or a parameter that can influence a factor, e.g. type of support mandated by the customer, SLA, project size and so on
3. Each parameter has several options, e.g. cutting edge technology, legacy systems, activities that can be carried out remote etc
4. The three locations considered are in-house: the existing team and infrastructure; that is, business as usual Local: select a supplier located at the project site or supplement the existing team with contractors Remote (including the use of remote locations/suppliers): the complete project or at least major parts of it can be outsourced to geographically distant locations, either within the same country or overseas (remote)
5. Unless there are other driving factors (such as availability of resources or cost), in general, projects utilizing cutting edge technology or methodologies are normally carried out in-house. Apart from the fact that the organization retains its competitive edge in terms of its capabilities in the new technology, it also ensures that its staff remain motivated. Note however that there needs to be ongoing and substantial investment in training programs that will enable its staff to keep abreast of advancements.
6. It is possible however, that the organization might wish to pilot new technologies, but let it stabilize before committing to train the in-house staff. This would, obviously be a good candidate to outsource.
7. Project staffing difficulties is invariably a good driver for outsourcing—especially for cutting edge tools, old or legacy applications or when the ramp up is very steep.
8. Development projects which have a high business functionality content rather than a technical component (e.g. process reengineering) should be handled in-house. If these projects lead to application reengineering, then the requirements definition and systems design should be carried out jointly with the outsourcing vendor.
9. The success (or failure) of outsourcing depends, to a large extent, on the choice of application (or process).

a. Very small projects (typically 1-5 FTEs) taken individually are not suited for outsourcing. Combining several such projects either by platform or business process will ensure that the result has adequate critical mass to be able to be outsourced.

b. Projects utilizing rapid application development (RAD) and/or joint application development (JAD) methodologies, because of their emphasis on frequent end-user interaction, are not precluded from being outsourced but only need to be handled slightly differently. In these cases, the on-site (or in-house) team consisting of project managers, business analysts, architects and other similar resources will interact with the end-user to agree/confirm requirements and feed this information to the remote development team. In essence, the on-site team will direct the offsite people, using them more as a 'virtual software factory'. A good example would be IBM's 'follow-the-sun' Java Beans project.

c. Client/Server applications typically involve frequent replications. This makes support from remote locations difficult to manage because of relatively complex physical environments and potential conflicts involving code versions and change control mechanisms. This can be overcome by using a combination of mirrored servers adopting planned replication strategies, so that an outsourcing option is still not ruled out.

d. Mission critical systems need to be handled on a case by case.

Whilst there is no fixed rule regarding their suitability for outsourcing, it is essential that an appropriate number of on-site (or in-house) personnel are retained to ensure that service SLAs, at least in respect of severity 1 errors, are met.

e. Real time systems, i.e., applications that control the working and operation of plant machinery or equipment can be supported from a remote location provided that the condition detailed above for mission critical systems.

f. Any system or application that is going to be sunset within the next 2–3 years would obviously not be a candidate for outsourcing g. Other business constraints such as security against competition, protecting financial or other sensitive information, legal issues arising from international access, intellectual property concerns, federal restrictions on the import/export of hardware or software need to be investigated up front on a case by case.

location. It also details the deliverables at the end of each milestone (or set of activities).

2. It is not necessary that every activity listed should be carried out; this would depend on the project characteristics and what has already been done or is available. For instance, it is possible that the requirement specifications have been agreed earlier or, the proposed system could be a stand-alone one, without any external interfaces.

3. Similarly, it is not neccessary that the phases should be carried out in sequence; there could well be a grey area between the finish of one phase and the start of the next. This is especially true of RAD projects.

TABLE 3

Outsourcing Decision Matrix

| Cumulative Weightage | Suggested Project Location |
|---|---|
| 00–20 | In-house, no outsourcing |
| 20–30 | Local, no remote |
| 30–40 | Predominantly local, with remote on a case by case (75:25) |
| 40–60 | Mix of on-site and remote (50:50) |
| 60–100 | Predominantly remote (including mission/project management transfer), with some on-site (80:20) |

Note:
Ratios are on-site:remote

THE PROJECT TYPES AND THEIR LIFE CYCLES:
DEVELOPMENT LIFE CYCLE

| | Location of Phase | | | | | |
|---|---|---|---|---|---|---|
| | On-site | On-site/ Project Phases | Remote | Remote | On-site/Remote | |
| | Requirement | Analysis | High Level Design | Low Level Design | Development | Development | Post Acceptance |
| ACTIVITY | Structured Interviews System Interfaces | Logical Data Model Process model's functions | Systems architecture Data Dictionary | Physical database Module specs | Progam Specs Code, Unit test | Functional verification Interface verification | User training Cut-off strategy |
| | Cost/Benefit analysis Project Objectives | Prototyping Project Plan and standards | User interface System Interface | Sub programs Test plan and User Acceptance criteria | Verification & Validation Link & System test | Stress test Performance test | Data transfer Pilot & Parallel run |
| | Deliverables Per Phase | | | | | | |
| | Requirement specs | Functional specs | System Design | System Design | Software Objects | User documentation, acceptance documentation | New environment (Cutover) |
| | Resource Distribution Per Phase | | | | | | |
| O:R | 100:0 | 100:0 | 50:50 | 50:50 | 20:80 | 30:70 | 80:20 |
| I:O | 80:20 | 50:50 | 50:50 | 25:75 | 10:90 | 20:80 | 30:70 |
| START | | | | | | | FINISH |

Note:
O:R = On-site location:Remote location, I:O = in-house:Outsourced

Table 3A: Milestones in a Development Life Cycle

1. Table 3A above defines the various milestones (phases) involved in a typical development project and attempts to categorise them into activities that can be carried out either on-site (i.e., at the project site) or at a remote 4. Note that the ratios are only typical values; actual figures will vary depending on the characteristics of the project. Also, since the team size will vary during the course of the project and even within a phase, the ratios depict the numbers relative to the team strength at a specific point in time and not for the average team size over the duration of the project.

2. CONVERSION LIFE CYCLE

TABLE 3B

Milestones in a Conversion Life Cycle

| | | | Location of Phase | | | |
|---|---|---|---|---|---|---|
| | On-site | On-site/ Remote | On-site | Remote | On-site/ | Remote |
| | | | | Project Phases | | |
| | Analysis | Pilot | Test Data | Conversion | Acceptance | Post Acceptance |
| ACTIVITY | Define source and target environments | Select pilot | Finalise test data generation points | Conversion of common routines | Verify functional equivalence | User training |
| | Data Structure Analysis | Generate test data for pilot | Freeze & archive production code (establish baseline version) | Conversion of source code | Verify Interfaces | Cutover strategy |
| | Job step analysis | Pilot reference runs | Generate test data using reference runs | Conversion of job control units | Stress tests | Implement incremental changes |
| | Strategy for conversion tools (if any) | Pilot conversion | Verify reference run results | Unit test, verification & validation | Performance tests | Data transfer |
| | Strategy for hardware & software variations incl special interfaces data & archive migtration | Evaluate results | | Comparision of results with test data | Verify data migration programs | Parallel runs |
| | Change control process and incremental code change mechanism | Update conversion guide | | Data migration programs | | Cutover |
| | | | Deliverables Per Phase | | | |
| | Draft conversion guide | Conversion guide | Test pack | Software Objects and documentation | Acceptance documentation | New environment |
| | | | Resource Distribution Per Phase | | | |
| O:R | 100:0 | 50:50 | 90:10 | 10:90 | 60:40 | 80:20 |
| I:O | 80:20 | 50:50 | 50:50 | 25:75 | 25:75 | 40:60 |
| START | | | | | | FINISH |

Note: O:R = On-site location:Remote location, I:O = in-house:Outsourced

1. Table 3B above shows the milestones in a Conversion Lifecycle comprising Analysis, Pilot, Test Data, Conversion, Acceptance and Post Acceptance. In the first phase, it is important to define accurately what the various components of the source and target environments will be. While this is common knowledge in very general terms (MVS/COBOL to Unix/C etc), it is important to go into fairly specific details, including version numbers, if required. This will enable the solution designers to find a home for every component of the source system.
2. This is invariably followed by a detailed mapping of the data structures. For instance, it might be required to migrate from an older hierarchic or networked database system to an RDBMS, in which case the database model needs to be reworked completely. Or if the migration is from an older or unsupported flat file system to VSAM.
3. Questions are often asked as to why job steps need to analysed in a one-for-one (or function-for-function) migration project. Given the rapid (and quantum) improvements in storage and processing technologies, a conversion project is often a good point to revisit the job steps to get rid of many practices that sometimes date back to the 60's!
4. At this point, the picture of the proposed system, in terms of the infrastructure requirement, becomes more clear, so one can start to consider some of the migration tools available in the market. In most cases, because of the complexity or age of the source system, it is impossible to find one single conversion tool. It might therefore be prudent to even consider breaking down the application to smaller modules such that several tools can do the job.
5. It is essential to compare the source and target environments to document the variations in the hardware and software platforms, true even when the migration is only an upgrade of versions. This is done for several reasons:
    a) Many programs, especially those written in the 60's and 70's, tend to exploit little known and undocumented features of the system architecture, operating system or language which might not always be available in, or have been carried forward to the new environment
    b) When moving across platforms, internal representations of data could cause major problems in the program flow. Examples include collating sequence (EBCDIC vs ASCII) and binary fields c) Variations in language implementation, both explicit and implicit, that could cause errors ranging from compilation errors to incorrect processing. Examples of explicit variations are the absence of some program statements as well as format differences, while implicit variations would be the way the compiler clears buffers after I-Os d) Later versions often have extra options for increased performance and efficiency e) Utilities in the source system might not have exact equivalents in the target system. One example is MVS/JCL and Unix/Shell. Obviously workarounds have to be standardised across the board.

f) Specific (or unique) interfaces or devices vital to the application might not always be supported in the new environment; hence other options might have to be considered g) Unless all the data is in a very rudimentary text format, or there exists third party utilities to convert the data to the target environment it will be required to write efficient programs that will manually convert all production data and any archived data to the new format. This could well vary from simply exporting data from the existing database(s) and importing into the new environment, through mapping individual fields and writing specific programs, to using low level utilities to decipher archived formats and directly translating them to the new platform. The actual strategy would depend to the circumstances and perhaps the volume of data to be migrated 6. One of the most important issues to consider when migrating 'living, breathing' production software is to properly baseline the version that will form the 'conversion development environment'. But doing this has its own problems connected with managing and incorporating any modifications to the core system during the course of the migration project, which will throw the original baseline and perhaps even the agreed reference data (and therefore the user acceptance criteria) out of sync. The suggested way out is to hold all amendments until after the base version has been converted and tested, and then include an additional 'catch-up' stage before the final user acceptance. Whilst this solution might be acceptable in most cases, there are sometimes bound to be instances when a mandatory design change could affect the base architecture itself, thereby rendering a significant portion of the migration useless from the functionality point of view. It is therefore necessary to form a change control team which includes vendor representation. This team should a) review all suggested/required change requests, deferring all but the most critical changes to until after the new software has been implemented b) prioritising even these important change requests to those that need to be effected immediately and those that can be incorporated in the incremental change phase c) study the impact of each change to the project plan, and decide accordingly d) ensure that the conversion project team is given adequate notice and information about these changes to incorporate them in situ 7. The output of the analysis phase is a draft conversion guide that will form the basis for project, in terms of strategy, standards, processes and procedures 8. The pilot phase, similar to the prototyping phase in a development project, is intended to validate all the assumptions in the draft migration guide, before they translate to costly errors during the actual conversion. With this objective in mind, it is vital that the selected candidate is, to the extent possible, representative of the total work, i.e. all possible combinations of paths in the migration process are tested.

9. Generating reference data forms a vital part of the baselining process. It establishes the criteria that will decide whether or not the migration has been successful and to plan. This activity is accomplished in several ways a) A convenient time window/period is established, for the purposes of gathering the test data b) Online systems—a snapshot of a typical period's processing is recreated, either from existing transaction logs or other extraction utilities c) Batch jobs—the JCLs or other job control programs are modified to include statements that will archive the relevant data files at various crucial points within the run. If a JCL controls more than one program, then it may be necessary to have multiple archive points within the JCL d) For both online and batch systems, ensure that the reference data includes pre and post images (i.e., before and after the programs update the records)

10. Using the draft conversion guide, the selected pilot is then converted to the new platform and tested 11. Upon completion of the pilot phase, the lessons learned are incorporated in the migration guide to arrive at the final version of the document

3. MAINTENANCE LIFE CYCLE

TABLE 3C

Milestones in a Maintenance Life Cycle

| | | | Location of Phase | | |
|---|---|---|---|---|---|
| | On-site/Remote | On-site | On-site | On-site/Remote | On-site/Remote |
| | | | Project Phase | | |
| | Planning | Knowledge Transfer | Managed Perform | Assisted Perform | Cutover & Steady State |
| ACTIVITY | Project selection and formation of transition management team | Overview, architecture, standards & procedures | Work on low priority errors/ enhancements under close supervision | Shared production support | Transfer project management control |

TABLE 3C-continued

Milestones in a Maintenance Life Cycle

| | | | | |
|---|---|---|---|---|
| Define scope environment SLAs backlog team size | Classroom training Update documentation | Assess level and quality of skills transfer | Shift development work to remote location | Optimise ADM processes |
| Define skills and levels | Document project inventory transition plan | Production maintenance and enhancement with management supervision | Implement new support strategy change control call handling mechanism end-user interfaces communication channels cutover | Identify critical resources and develop backup staff plan |
| Prepare staffing plan | Assess team skills tutor skills | Define support procedures/ processes and cutover strategy | Checkpoint review with end-user/ customer | Optimise skills pool by cross training |
| Cost benefit analysis and business case | Define support strategy infrastructure | Define productivity and QA measurement criteria | | Possible mission transfer |
| Skills gap analysis and incremental training Professional councelling for displaced staff | Identify team members & composition | | | |

Deliverable Per Phase

| | | | | |
|---|---|---|---|---|
| Project plan, staffing plan, skills matrix, gap analysis and training plan | Transition plan | Basic support control plan | Comprehensive support control plan | Periodic review reports |

Resource Distribution Per Phase

| | | | | | |
|---|---|---|---|---|---|
| O:R | 90:10 | 90:10 | 90:10 | 25:75 | 25:75 |
| I:O | 70:30 | 50:50 | 30:70 | 15:85 | 0:100 |
| START | | | | | FINISH |

Note: O:R = On-site location:Remote location, I:O = in-house:Outsourced

The above table 3C is illustrated by way of a flow diagram as shown in FIG. 2 which is self-explanatory.

Interpretation 3.1 Planning

After the selection of the business process or application that is to be transitioned, a transition management team is formed comprising the vendor and customer project managers and representation from HR, finance and infrastructure services At a macro level, the outsourcing process for a maintenance life cycle may be divided into several distinct phases. Each stage has its own quality gates in terms of clearly defined entry and exit criteria that help the management team decide whether or not an individual is ready to move up the transition ladder. Obviously the jump from staged to staged implies the successful completion of the skills transfer exercise and the key to reaching this point will be the many checkpoints on the way to judge the pace of progress.

a) Planning
b) Knowledge transfer
c) Assisted perform
d) Managed Perform
e) Cutover and Steady State An exhaustive analysis of the chosen system should be carried out to document a) The environment. This is especially important when very old applications based on unique hardware/software platforms are being considered which may not have adequate documentation or customer support at the remote location (if it is required that these be installed there). This could be true even of some client/server applications. Similarly the availability of data communication lines with adequate bandwidth to ensure comparable response times needs to be confirmed b) Service Level Agreements (SLAs). This is important, especially when the remote location is another country or in a different time zone. SLAS, if not properly vetted, can affect the feasibility and even the fianancial viability of the proposed outsourcing deal. Some examples are:
  i. assuming a normal 8×5 support when the requirement is for 24×7
  ii. a Help Desk or similar infrastructure is expected
  iii. the remote location is in a different time zone and the requirement is for the staff to work to the customer's business hours
immediate response times imply additional investment in home terminals or even keeping the office equipment working all the time c) The size of the current team could well be less than proposed team size, taking into account the experience and skill levels. Critical areas should therefore be identified well in advance so that extra resources can be deployed to overcome the lower productivity levels in the initial stages which might impact the quality of service d) Backlog. This refers to the errors and enhancement requests that are currently outstanding. This list, especially the lower priority errors and change requests represents a good opportunity for the new team to come to grips with the application during the skills transfer phase, without the dangers of working on high priority/complex problems during the initial stages It is of paramount importance that, prior to commencing the transition, the skills required for each role/position within the team is understood and documented very clearly. This is best done by mapping the skills of the existing team—at an individual level—as 'primary' (mandatory for the position) and 'secondary' (nice to have). Apart from ensuring that the selected team member is as close a fit as possible to the envisioned role—especially those that require significant customer interaction—this template eliminates any grey areas that might exist in respect of specialisation within a category. For example, DB2 might simply be taken to mean regular DB2 programming rather than say, an implied ability to write complex queries or perform database tuning! A sample is provided in Appendix D. The major criteria would be role (position within the team, expected activities)

technical (platform skills—MVS, PL/1, systems design etc.)

application (business knowledge—accounting, manufacturing, invoicing etc.)

personal (customer interaction, participate in JARs, work independently)

managerial (lead a team, schedule/prioritise work, review/report)

Having determined the skills required to do the job, it is necessary to baseline the skills within the new project team to determine the gap between requirement and availability and carry out any incremental training.

While not exactly a part of the maintenance transition (it belongs more in project management), nevertheless, because of its importance in the transition exercise, there needs to be a professional counselling strategy for the displaced staff. The HR department and the individual project managers need to determine the specific concerns of the existing team members and discuss the future plans with them. Since they are the people who will be imparting the application knowledge, it is extremely vital that the management gets their buy-in A sample staffing plan is provided in Example I 3.2 Knowledge Transfer This section describes the scope of the skills transfer (i.e. what will be covered)

the timetable for the transfer (i.e. when it will be done)

the resources responsible for the transfer (i.e. who will be do it and to whom)

EXAMPLE II OUTLINES A SAMPLE SKILLS TRANSFER PLAN

The plan is jointly put together by the customer and vendor project managers and ensures that no topic is left uncovered adequate time is spent on the main areas there is a judicious mix of classroom training and practical work day-to-day activities are not impacted by the skills transfer 3.2.1 Classroom Training 1. During this stage, the new team goes through formal training sessions. In addition to the actual application, topics covered also include standards, procedures and processes, testing, QA and so on. Whilst the pattern is more rigid during the initial weeks, the latter parts are based more on the experience of the existing team and focused on the likely problem areas. Sometimes, if the topics covered are extremely complex or there is little or no supporting documentation, it is recommended that the classroom training is recorded on audio tapes and later transcribed to a document or if possible, even video taped. In addition to serving as reference material that the new team can revisit repeatedly during the skills transfer, these tapes can be used for knowledge transfers too (i.e. when inducting new members into the team or for cross training)

2. A good form of gaining application knowledge would be to update gaps in the existing documentation 3. At this point, it would be needed to put together the transition plan. This documents:
    a) the project inventory. That is, details of the various applications such as where the code is located (libraries, directories, production vs development), machine names, networking information, user ids, contact personnel and so on
    b) how the transition will be accomplished, the various checkpoints, quality gates and feedback mechanisms.

4. Progress is measured by
    a) Self assessment: The team fills out an assessment sheet periodically showing how much they have improved during that period. The scale ranges from 1 (elementary) to 5 (guru, capable of teaching).
    b) Trainer assessment: The customer project manager, with input from the various instructors, assesses the team. For the skills transfer to be on schedule, the two assessments should be fairly close.
    c) Team presentations: The instructor identifies specific topics that team members will then present. This enables knowledge sharing, clarifying misconceptions/wrong assumptions and helps focus better on the grey areas.
    d) Team discussions: Old problem reports (or design changes) are discussed in an open forum or as classroom exercises, with the team providing possible solutions.

5. At the end of this phase, the strengths and weaknesses of the new team members will be known fairly well. Hence the transition management team would now be in a position to arrive at the organisation of the new team, in terms of
    a) who supports which part of the application; this would be largely dependent on the platform skills and aptitude
    b) assigning the individual roles (i.e., team leads, tech leads, customer interfaces, analysts, programmers etc)
    c) composition (i.e. on-site: remote ratio), driven primarily by the support requirements of the application as well as the skill level within the team.

3.2.2 Managed Perform

1. The team now starts on real problems, working their way through low severity or cosmetic changes to more complex problems involving other subsystems, modules or even applications.
2. During this phase, designs are either provided or discussed in advance, code walkthroughs or inspections are common and sign-offs or verbal OK's are mandatory.
3. Code promotions require the specific approval of the team leader or project manager.
4. Customer interaction is still the responsibility of the existing in-house team leads or project manager.
5. Towards the end of this stage, the in-house team will slowly start to move out of their primary roles and then, out of the team.
6. The transition management team will now start to focus on the new support procedures and cutover strategy. Given that support team will now span multiple locations, and possibly even several countries, the 'legacy' support procedures need to be checked to ensure how they will be used in the new environment. New activities might needed to be added to the process to cater for the remote location. The outcome of all this is the Support Control Plan (SCP) that will serve as the definitive document to manage the support of the outsourced applications. Issues that this document will address include
   a) Support workflow
   b) Primary call interface and handling
   c) Call/problem handover between the various locations
   d) Code synchronisation between the various locations
   e) Call closure
   f) Coding and testing standards
   g) QA
   h) Code promotion
   i) SLA
   j) Service review and reporting
   k) Escalation channels
   l) Disaster recovery and exception handling 3.2.3 Assisted Perform
1. At this point, the skills transfer is more or less complete.
2. It is expected that the team is able to carry out all the activities of the software life cycle with minimum dependence on their in-house counterparts.
3. Sign-offs are limited to important milestones such the design document, integration testing and pre-promotion testing. All work will still continue to be prioritised and scheduled either by, or with the approval of, the in-house project manager.
4. During this period, the vendor tech leads/team leads will be given responsibility to own the designs or problem resolution. They will start to interface with the end-user/customer, schedule JARs, discuss design changes with the customer and, in a maintenance environment, assume responsibility for error closure. In other words, they will start to build a rapport with the field staff and operations support, thus getting to know how the processes work.

3.3 Cutover and Steady State

Though not actually a part of skills transfer, this stage serves to denote that the vendor team is now ready to take on project management responsibility, i.e. own the support service in-house management, if any, is limited to a single executive level Having reached this point, the focus now shifts to
   a) increasing productivity—by reducing turnaround times, zero rework, fewer iterations during the requirements phase, reducing test times and so on
   b) process optimisation—revisiting the existing call handling and support processes to iron out wrinkles/inefficiencies caused by the multiple support locations or simply because of the age of the system
   c) creating back-up skills—as the support service matures, it is inevetible that unplanned demands for skilled resources are likely to be encountered or, voids created by staff attrition. In order that the quality of service is not affected, it is important to create a secondary line of skills who can assist, should the necessity arise
   d) cross training—very often, because of the nature of the service, areas of expertise will start to form within the team. Whilst this has its advantages, it also implies that at certain times, some parts of the team are not likely to be loaded 100%, thus affecting staff morale. Cross training achieves the dual objectives of creating additional skills that can be deployed elsewhere and giving the team members the opportunity to work either on other platforms or in several business areas staff rotation plans—legacy systems have been in production for so long that in most cases, they tend to be very stable and require minimum attention. Whilst this is good from a service point of view, this can have an adverse effect on the team. Similarly, there is often a desire to move onto newer techonologies or up the value chain, as part of a career progression. It is therefore important to have a plan that demonstrates to the team the intention to move people out of the project in a planned and controlled manner such that there is adequate handover, and this happens during a non-peak period.

3.4 Progress Review

To ensure that the skills transfer is on track, it is important that the management team receives timely feedback from the people conducting and undergoing the transition. The following activities enable appropriate remedial action to be taken:
1. Weekly project review: Held between the vendor site manager and the in-house project managers. This team assesses staff performance at an individual level. Sample report in Example III.
2. Monthly management review: Conducted by the transition executives with the other in-house and vendor managers participating. Reviews the
   a) progress of skills transfer at a higher level
   b) financials
   c) feedback from the end-users and/or customer
3. Vendor team meeting: Conducted by the vendor managers to address issues that the team might not feel comfortable passing on directly to their in-house counterparts.

3.5 Tracking Performance

As in any outsourcing initiative, it is important to monitor the progress of the transition as well as the post transition steady state period in order to compare the performance with respect to the in-house team report back to the management.

A series of graphs and charts that summarise the information that needs to be monitored and collected is provided in the Appendix 'Monitoring Progress' in the FIGS. 4 to 16.

EXAMPLE I

Staffing Plan

Overview

The staffing plan is, perhaps, the single most important document to come out of the planning phase. Apart from providing the basis for the transition project plan, it provides a business model that demonstrates the feasibility of the outsourcing proposal itself. It contains the following important information 1. Details of the current team, by role and skill
2. Labour rates, used to derive the nett cost of the exercise
3. Staff transition plan—person by person—month on month and year on year
4. Financial summary Note that in the following plan, 'In-house' refers to the existing project team, comprised of both regular employees and contractors, 'Vendor' refers to the supplier that the application will be outsourced to, 'Local' refers to the current project location, 'Remote' refers to the location that the vendor will support from—this could be in the same city or even in a different geography.

1.2 Skills Matrix

Status refers to whether the person is a regular employee or a subcontractor

The number of years of experience on the application and in IT follow

The skills level on the various platforms is expressed on a scale of 1–5, with the following meaning Level 1=training received, no work experience in the area Level 2=some work experience, typically less than 1 year Level 3=significant experience, typically 2–3 years Level 4=can troubleshoot, can teach Level 5=expert, in depth knowledge 1.3 Rates This section defines the hourly rates (and the organisational uplifts, adders and overheads to be factored in) to arrive at the financial feasibility of the proposed outsourcing

| Name & Role | Status | Appln (yrs) | Total (yrs) | DB2 | CICS | PL/I | COBOL | Assembler | Comments |
|---|---|---|---|---|---|---|---|---|---|
| Project Manager | Reg | 3 | 20 | 3 | 3 | 2 | 2 | | Strong PM and interpersonal skills |
| Person 1 | Reg | 4 | 9++ | 3 | 3 | 4 | 4 | 3 | Tech Lead |
| Person 2 | Reg | <1 | 6 | 3 | 2 | 2 | 1 | | Knows Client/Server |
| Person 3 | Reg | 4++ | 13 | 5 | 4 | 3 | 3 | 3 | Conversion Expert, DB2 Tuning |
| Person 4 | Contr | 2 | NA | 2 | 2 | 3 | 3 | | |

It is important to list all existing team members and their roles (project manager, analyst/programmer etc) AND their responsibilities (customer interaction, database administration etc)

initiatitive. It ensures that all variables are captured in one place such that any changes that might impact the financials are noted immediately. As with most maintenance projects, all finances are projected for 3 or 5 year durations.

| | 1999 | | | 2000 | | | 2001 | | |
|---|---|---|---|---|---|---|---|---|---|
| | Skill A | Skill B | Skill C | Skill A | Skill B | Skill C | Skill A | Skill B | Skill C |
| Base Rates | | | | | | | | | |
| in-house Rate | $40.00 | $50.00 | $60.00 | $42.00 | $52.50 | $63.00 | $44.10 | $55.13 | $66.15 |
| vendor On-site Rate | $45.00 | $50.00 | $55.00 | $47.25 | $52.50 | $57.75 | $49.61 | $55.13 | $60.64 |
| vendor Remote Rate | $20.00 | $30.00 | $40.00 | $22.00 | $33.00 | $44.00 | $24.20 | $36.30 | $48.40 |
| Remote Adders | | | | | | | | | |
| G&A | $1.40 | $2.10 | $2.80 | $1.40 | $2.10 | $2.80 | $1.40 | $2.10 | $2.80 |
| Other | $0.40 | $0.60 | $0.80 | $0.40 | $0.60 | $0.80 | $0.40 | $0.60 | $0.80 |
| On-site Adders | | | | | | | | | |
| Occupancy | $0.85 | $0.85 | $0.85 | $0.85 | $0.85 | $0.85 | $0.85 | $0.85 | $0.85 |
| Infrastructure | $1.00 | $1.00 | $1.00 | $1.00 | $1.00 | $1.00 | $1.00 | $1.00 | $1.00 |
| G&A | $3.15 | $3.50 | $3.85 | $3.15 | $3.50 | $3.85 | $3.15 | $3.50 | $3.85 |
| Other | $0.60 | $0.90 | $1.20 | $0.60 | $0.90 | $1.20 | $0.60 | $0.90 | $1.20 |
| Nett Rates | | | | | | | | | |
| Nett in-house Rate | $45.00 | $55.35 | $65.70 | $47.00 | $57.85 | $68.70 | $49.10 | $60.48 | $71.85 |
| Nett vendor On-site Rate | $50.60 | $56.25 | $61.90 | $52.85 | $58.75 | $64.65 | $55.21 | $61.38 | $67.54 |
| Nett vendor Remote Rate | $21.80 | $32.70 | $43.60 | $26.75 | $38.40 | $50.05 | $28.95 | $41.70 | $54.45 |
| Billable hours per month | 158 | | | | | | | | |

1.3.1 Interpretation

In this example, the in-house rate refers to the cost of the existing project team, vendor on-site rate refers to the rate that the vendor will charge for people based at the current project location and vendor remote rate refers to the rate that will be charged for people to work out of a remote vendor location Skills A, B and C refer to the different rates applicable to the resources, either based on experience levels (project manager, architect, analyst-programmer, programmer), on platform (SAP, mainframe, Java and so on), or a combination of both Generally, the organisation's overheads are factored into the base rates to arrive at charge-out rates. Since these uplifts will vary depending on the project location (in-house or remote), different adders have been assumed for the two cases Year on year inflation figures of 5% for the in-house location and 10% for the remote location have been assumed A 3 year project duration has been assumed for the forest, with a transition start date of January 1999.

1.4 STAFF TRANSITION MATRIX

|  | IH/VE | Rate | L/R | 99/01 | 99/02 | 99/03 | 99/04 | 99/05 | 99/06 | 99/07 | 99/08 | 99/09 | 99/10 | 99/11 | 99/12 | I-H (p-m) | vendor (p-m) Local | vendor (p-m) Remote | in-house Cost | vendor Cost (L) | vendor Cost (R) |
|---|---|---|---|---|---|---|---|---|---|---|---|---|---|---|---|---|---|---|---|---|---|
| Proposed Team | | | | | | | | | | | | | | | | | | | | | |
| | | | | | | | | 1.4.1 Staff Transition - 1999 | | | | | | | | | | | | | |
| IH-Project Executive | IH | $65.70 | L | 0.5 | 0.5 | 0.5 | 0.25 | 0.25 | 0.25 | 0.25 | 0.25 | 0.25 | 0.25 | 0.25 | 0.25 | 3.75 | | | $39,009 | | |
| IH-Project Manager | IH | $65.70 | L | 1 | 1 | 1 | 1 | 1 | 0.5 | 0.5 | 0.5 | 0.5 | 0.5 | 0.5 | 0.5 | 8.5 | | | $88,421 | | |
| IH-Transition Manager | IH | $55.35 | L | 1 | 1 | 1 | 1 | 0.5 | 0.5 | 0.5 | 0.5 | 0.5 | 0.5 | 0.5 | 0.25 | 7 | | | $61,346 | | |
| vendor Project Manager | VE | $55.35 | L | 1 | 1 | 1 | 1 | 1 | 0.5 | 0.5 | 0.5 | 0.5 | 0.5 | 0.5 | 0.5 | 8.5 | 8.5 | | | $88,421 | |
| Name 1 | IH | $56.25 | L | 1 | 1 | 1 | 1 | 1 | 1 | 0.5 | 0.25 | 0.25 | 0.25 | 0.25 | 0.25 | 6.5 | | | $56,964 | | |
| vendor Replacement 1 | VE | $45.00 | L | | | | | | 1 | 1 | 1 | 1 | 1 | 1 | 1 | | 9 | | | $80,156 | |
| Name 2 | IH | $50.80 | L | 1 | 1 | 1 | 0.5 | 0.5 | 0.5 | | | | | | | 4.5 | | | $32,063 | | |
| vendor Replacement 2 | VE | $50.80 | R | | | | | | | 1 | 1 | 1 | 1 | 1 | 1 | | | 9 | | $24,035 | $31,065 |
| vendor Replacement 4 | VE | $50.60 | L | | | | 1 | 1 | 1 | | | | | | | | 3 | | | $24,035 | |
| vendor Replacement 4 | | $21.80 | R | | | | | | | 1 | 1 | 1 | 1 | 1 | 1 | | | 9 | | | $31,065 |
| Name 3 | IH | $65.70 | L | 1 | 1 | 1 | 1 | 1 | 1 | 1 | 1 | 1 | 1 | 1 | 1 | 12 | | | $124,830 | | |
| vendor Replacement 3 | VE | $43.60 | R | | | | | | | | | | | | | 0 | | 9 | | | $62,130 |
| Name 4 | IH | $45.00 | L | | | | | | | | | | | | 1 | 0 | 1 | | $0 | $7,125 | |
| TOTALS | | | | 5 | 5 | 5 | 6.5 | 6 | 6 | 5.25 | 6.25 | 5.25 | 5.25 | 5.26 | 5.25 | 23 | 16 | 27 | $402,634 | $223,773 | $124,260 |
| Current in-house Team | | | | | | | | | | | | | | | | | | | | | |
| IH-Project Executive | IH | $65.70 | L | 0.5 | 0.5 | 0.5 | 0.5 | 0.5 | 0.5 | 0.5 | 0.5 | 0.5 | 0.5 | 0.5 | 0.5 | 6 | | | $62,415 | | |
| IH-Project Manager | IH | $65.70 | L | 1 | 1 | 1 | 1 | 1 | 1 | 1 | 1 | 1 | 1 | 1 | 1 | 12 | | | $124,830 | | |
| Name 1 | IH | $55.35 | L | 1 | 1 | 1 | 1 | 1 | 1 | 1 | 1 | 1 | 1 | 1 | 1 | 12 | | | $105,165 | | |
| Name 2 | IH | $45.00 | R | 1 | 1 | 1 | 1 | 1 | 1 | 1 | 1 | 1 | 1 | 1 | 1 | 12 | | | $85,500 | | |
| Name 3 | IH | $65.70 | L | 1 | 1 | 1 | 1 | 1 | 1 | 1 | 1 | 1 | 1 | 1 | 1 | 12 | | | $124,830 | | |
| Name 4 | IH | $45.00 | L | 1 | 1 | 1 | 1 | 1 | 1 | 1 | 1 | 1 | 1 | 1 | 1 | 12 | | | $85,500 | | |
| TOTAL CURRENT SPEND | | | | 4 | 4 | 4 | 4 | 4 | 4 | 4 | 4 | 4 | 4 | 4 | 4 | 48 | | | $588,240 | | |
| | | | | | | | | 1.4.2 Staff Transition - 2000 | | | | | | | | | | | | | |
| IH-Project Executive | IH | $88.70 | L | 0.25 | 0.25 | 0.25 | 0.25 | 0.25 | 0.25 | 0.25 | 0.25 | 0.25 | 0.25 | 0.25 | 0.25 | 3.75 | | | $40,791 | | |
| IH-Project Manager | IH | $68.70 | L | 0.5 | 0.5 | 0.5 | 0.25 | 0.25 | 0.25 | 0.25 | 0.25 | 0.25 | 0.25 | 0.25 | 0.25 | | | | | | |
| vendor Project Manager | VE | $58.75 | L | 0.5 | 0.5 | 0.5 | 0.5 | 0.5 | 0.5 | 0.5 | 0.5 | 0.5 | 0.5 | 0.5 | 0.5 | | 6 | | | $55,813 | |
| vendor Replacement 1 | VE | $58.75 | R | 1 | 1 | 1 | 1 | 1 | 1 | 1 | 1 | 1 | 1 | 1 | 1 | | 12 | 12 | | $111,625 | |
| vendor Replacement 2 | VE | $26.75 | R | 1 | 1 | 1 | 1 | 1 | 1 | 1 | 1 | 1 | 1 | 1 | 1 | | | 12 | | | $38,119 |
| vendor Replacement 4 | VE | $26.75 | R | 1 | 1 | 1 | 1 | 1 | 1 | 1 | 1 | 1 | 1 | 1 | 1 | | | 12 | | | $38,119 |
| Name 3 | IH | $68.70 | L | 1 | 1 | 1 | 1 | 1 | 1 | 1 | 1 | 1 | 1 | 1 | 1 | | | | $10,878 | | |
| vendor Replacement 3 | VE | $50.05 | R | 1 | 1 | 1 | 1 | 1 | 1 | 1 | 1 | 1 | 1 | 1 | 1 | 1 | | 12 | | | $95,095 |
| TOTALS | | | | 4 | 3 | 3 | 4.75 | 4.76 | 4.75 | 4.75 | 4.75 | 4.75 | 4.75 | 4.75 | 4.75 | 4.76 | 18 | 30 | $51,668 | $167,438 | $171,333 |

-continued

1.4 STAFF TRANSITION MATRIX

1.4.3 Steady State - 2001

| | | | | | | | | | | | | | |
|---|---|---|---|---|---|---|---|---|---|---|---|---|---|
| IH-Project Executive | IH | $71.85 | L | 0.26 | 0.25 | 0.25 | 0.25 | 0.25 | 0.25 | 0.25 | | | |
| IH-Project Manager | IH | $71.85 | L | 0.25 | 0.25 | 0.25 | 0.25 | 0.25 | 0.25 | 0.25 | | | |
| vendor Project Manager | VE | $61.38 | L | 0.5 | 0.5 | 0.5 | 0.5 | 0.5 | 0.5 | 0.5 | 3 | | $34,129 |
| vendor Replacement 1 | VE | $67.54 | L | 1 | 1 | 1 | 1 | 1 | 1 | 1 | | 6 | $58,306 |
| vendor Replacement 2 | VE | $28.95 | R | 1 | 1 | 1 | 1 | 1 | 1 | 1 | | 12 | $128,321 |
| vendor Replacement 4 | VE | $28.95 | R | 1 | | 1 | 1 | 1 | 1 | 1 | | 12 | $41,254 |
| vendor Replacement 3 | VE | $54.45 | R | 1 | | 1 | 1 | 1 | 1 | 1 | | 12 | $41,254 |
| | | | | | | | | | | | | 12 | $103,455 |
| TOTALS | | | | 2.76 | 2.75 | 2.75 | 4.75 | 4.75 | 4.75 | 4.75 | 3 | 30 | $34,129 $185,963 |

1.4.4 Financial Summary

| In-scope Line Items | 1999 Current Cost | 1999 Outsourced | 1999 Difference | 2000 in-house | 2000 Outsourced | 2000 Difference | 2001 In-house | 2001 Outsourced | 2001 Difference |
|---|---|---|---|---|---|---|---|---|---|
| Application Support Cost | $588,240 | $745,552 | -$157,312 | $617,652 | $390,438 | $227,214 | $648,535 | $406,719 | $241,816 |
| Other Costs 1 | | | | | | | | | |
| Other Costs 2 | | | | | | | | | |
| TOTAL COST | $588,240 | $745,552 | -$157,312 | $617,652 | $390,438 | $227,214 | $648,535 | $406,719 | $241,816 |
| PROJECTED SAVINGS | | 26.7% | | | | 36.8% | | | 37.3% |

1.4.5 Interpretation

The staffing matrix describes in great detail when each member of the existing team will transition and how each skills transfer period will affect the cost of the total transition There needs to be a plan for each module or application, depending on the required granularity of the financials. However, it should be ensured that all in-house employees are accounted for in the plan, irrespective of whether they will be replaced In the template shown above
  a) IH/VE describes whether the person is an in-house employee or a vendor
  b) The Rate is the burdened rate obtained from the rate table
  c) L/R, the location indicator denotes where the resou e will work. For a vendor resource, it can either be Local or Remote
  d) Each of the subsequent 12 month time periods denotes the amount of time the person will spend on the application, in person-months
  e) The columns I-H (p-m), vendor (Remote) and vendor (Local) show the total effort per year, in person-months due to the in-house staff and vendor staff (at the local and remote locations)

The plan for each year of transition consists of 2 parts
  a) Proposed Team—this defines the proposed transition staffing plan
  b) Current in-house Team—this describes the current team and how much the staff costs are. This will be used later to determine the savings achieved by the outsourcing In this particular example for 1999
  a) It is intended that resource Name 1 will remain for the whole year. Hence transition for this person will only start in April 1999
  b) Resource Name 2 will train 2 vendor resources on-site for 3 months, after which both are expected to work from the remote location. Hence the location designator after the skills transfer changes to 'R'

Resource Name 4 is not expected to perform any transition

The financial summary page shows what the transition is expected to cost and the savings the outsourcing will result in over a 3 or 5 year period. Because of the 'bubble cost'(i.e. the need to maintain two teams) during the transition, the start date (the earlier the better) and the duration of each skills transfer will play the major part in determining the financial feasibility of the initiative. In addition to the support costs, 'Other Costs 1' and 'Other Costs 2' could be costs due to business travel, setting up new infrastructure or incremental training.

EXAMPLE II:

SAMPLE SKILLS TRANSFER PLAN

1.1 EDUCATION SCHEDULE

| Date | Time | Location | Subject | Presenter |
|---|---|---|---|---|
| Apr. 12, 1999 | 2 pm–3 pm | 2A-14 | Org Overview | J. Davis/ G. Maddaloni |
| Apr. 13, 1999 | 10 am–11 am | 2A-14 | System Overview | R. Ceconi |
| Apr. 13, 1999 | 2 pm–3 pm | 3A-12 | Application Regions | S. Shah |
| Apr. 16, 1999 | 1 pm–3 pm | 2A-14 | Pricing Overview | J. Baselice |
| Apr. 20, 1999 | 1 pm–3 pm | 2A-14 | Front End | J. Cruz |
| Apr. 23, 1999 | 1 pm–3 pm | 2A-14 | Portfolio | C. Pitz/F. Ortiz |
| Apr. 26, 1999 | 2 pm–3 pm | 2A-14 | Org Overview | J. Davis/ G. Maddaloni |
| Apr. 27, 1999 | 10 am–11:30 am | 2D-85 | System Overview, Cont'd | R. Ceconi |
| Apr. 27. 1999 | 2 pm–5 pm | 3A-12 | MBA | K. Purdy |

1.2 SYSTEM EDUCATION

| Topic | Responsible | Notes |
|---|---|---|
| How to logon TSOD1, TSOP1 | Assigned Employee | 1 on 1. |
| How to use ChangeControl | Assigned Employee | 1 on 1. |
| How to use SDSF | Assigned Employee | 1 on 1. |

1.2.1 CICS/IMS Environment

| Topic | Responsible | Notes |
|---|---|---|
| How to logon CICS/IMS | Assigned Employee | 1 on 1. |
| How to use MSLs | Assigned Employee | 1 on 1. |
| Development regions overview | S. Shah | High level. No details on promote procedures at this point. |

Schedule

| Dates | Delivery Method | Pre-Req | Handouts | Notes |
|---|---|---|---|---|
| Apr. 13, 1999 | Demo (A/V) | Read application documentation | Yes | |
| Apr. 27, 1999 | | | | |
| May 11, 1999 | | | | |
| Jun. 8, 1999 | | | | |

1.2.2 Organization Overview

| Topic | Responsible | Notes |
|---|---|---|
| Customer Information | Marie Wolfson | Topics will include current and future deployment plans. |
| Business Area - management structure | G. Maddaloni | Calo's organization |
| BTOP/IPMT Process | G. Maddaloni | |

| Dates | Delivery Method | Pre-Req | Handouts | Notes |
|---|---|---|---|---|
| Apr. 12, 1999 | Charts | None | Yes | |
| Apr. 26, 1999 | | | | |
| May 10, 1999 | | | | |
| Jun. 7, 1999 | | | | |

1.2.3 System Architecture

| Dates | Delivery Method | Pre-Req | Handouts | Notes |
|---|---|---|---|---|
| Apr. 13, 1999 | Charts | System Architecture | | 45 minutes for overview 15 minutes for Q&A's |
| Apr. 27, 1999 | | | | |
| May 11, 1999 | | | | |
| Jun. 8, 1999 | | | | |

1.3 PRICING -continued

| Dates | Delivery Method | Pre-Req | Hand-outs | Notes |
|---|---|---|---|---|
| Apr. 16, 1999 | Demo (A/V) | Overview | Yes | 2 hours. |
| Apr. 30, 1999 | | | (Person 2) | Topics include: Special Bids, Direct Rates, TCM, Bid Edits, Routing Bids, Text Manager, Common Functions, CSI. |
| May 14, 1999 | | | | |
| Jun. 11, 1999 | | | | Also, AD/M Tracking database overview. |

1.4 PORTFOLIO
Person 3 (Receive and Adjustments), Person 4 (Billing)

| Dates | Delivery Method | Pre-Req | Handouts | Notes |
|---|---|---|---|---|
| 1. Apr. 23, 1999 | Charts (Receive) | Front End | Read LA Disk doc. for those working on Billing | Order: 1. Receive 2. Billing 3. Adjustments |
| l. May 7, 1999 | LA Disk (Billing) | | | |
| 1. May 21, 1999 | Demo (Adj.) | | | |
| l. Jun. 18, 1999 | | | | |

1.5 DEVELOPMENT

| Topic | Complete | Notes |
|---|---|---|
| Application Requirements | | |
| AD/M Database | | |
| Sizing/Estimating | | |
| Checklists | | |
| Requirements signoff | | |
| Naming standards | | |
| How to modify a program | | |
| Debugging Tools (BTS, Intertest, Platinum) | | |
| How to compile and link | | |
| How to move code from DEV to TEST to PROD | | |
| How to test changes | | |
| How to access development data files | | |
| How to access production data files | | |
| How to access data outputs (RMDS) | | |
| How to access production JCL | | |
| Promotion procedures | | |
| Kliewe Management System (JFXTLOG) | | |
| Promotion approval | | |
| Function test | | |
| Test plan | | |

1.6 EDUCATION SKILL LEVEL SELF ASSESSMENT
Name: _____

| Topic | Rating (15 days) | Rating (30 days) | Rating (45 days) | Rating (Final) |
|---|---|---|---|---|
| Application Requirements | | | | |
| AD/M Database | | | | |
| Sizing/Estimating | | | | |
| Checklists | | | | |
| Requirements signoff | | | | |
| Naming standards | | | | |
| How to modify a program | | | | |
| Debugging Tools (BTS, Intertest, Platinum) | | | | |
| How to compile and link | | | | |
| How to move code from DEV to TEST to PROD | | | | |
| How to test changes | | | | |
| How to access development data files | | | | |
| How to access production data files | | | | |
| How to access data outputs (RMDS) | | | | |
| How to access production JCL | | | | |
| Promotion procedures | | | | |
| Kliewe Management System (JFXTLOG) | | | | |
| Promotion approval | | | | |
| Function test | | | | |
| Test plan | | | | |

| Skill Level | Description |
|---|---|
| 1 | Training received, no work experience |
| 2 | Limited ability to perform. Has general, conceptual knowledge only. |
| 3 | Can perform with assistance. Has applied knowledge. |
| 4 | Can perform without assistance. Has in-depth knowledge. Can lead or direct others in performing |
| 5 | Can give expert advice and lead others to perform. Is sought by others for consultation and leadership. Has comprehensive knowledge with ability to make sound judgements. |

1.7 Final Presentation (Final Week)

In order to evaluate your understanding of the system, prepare a one (1) hour presentation and be prepared to answer questions on the application, in general, how the various functions fit together, and in particular the function that you will be supporting. This will allow for any misunderstandings and incorrect assumptions to be cleared before moving back offsite.

EXAMPLE III

Sample Transition Plan 1.1 Background

This document outlines the plan to transition the application skills from ABC to XYZ.

1.2 Objective

The objectives of this document are to:

document strategy for transitioning application skills to the vendor staff list of key staff involved in transition explain roles and responsibilities of the key staff identify risks and specify mitigation plans 1.3 Scope of Transition The following modules have been included in the scope of transition: Accounting Contract Management—including Portfolio Management and Front End Pricing Country Development Ledger Reconciliation Backlog It is to be noted that Operations support work is NOT included in the scope of transition.

1.4 Transition Team Organization 1.4.1 Current Team Organisation 1.4.2 Proposed Team Organistion 1.4.3 Team Contact Details

| Name | Role | Contact Number | E-mail id |
|------|------|----------------|-----------|
|      |      | *              |           |

1.5 Roles and Responsibilities

Please refer to Appendix-I for definition of responsibilities for various roles mentioned in above table.

1.6 Transition Strategy

Transition of application skills will happen in three phases as described below:

Knowledge Transfer—Training

This will involve classroom sessions conducted by current managers and staff, demonstration of application modules, one on one sessions between present team and vendor staff. Each vendor staff will be assigned to one or more in-house staff for mentoring. All classroom training sessions will be run periodically to accommodate vendor staff arriving on different dates.

Please refer to the 'Training Plan' document (maintained by the Transition Manager) for details on the training sessions, responsibilities and schedules.

Managed Perform vendor staff will be assigned live work. Close guidance and monitoring will be provided by the assigned the current staff.

Assisted Perform vendor staff will be assigned live work. Assistance will be provided by the in-house staff whenever requested by the IGSI staff.

It is to be noted that the above phases indicate general progression of the skills transfer process. They may not be very distinct phases on a timeline in the sense that there may be some overlap (like vendor staff working on live problems and extending some technical assistance during the training phase).

1.7 Measurement of Success

The following criteria will be used for measuring the success of transition for each
staff from the vendor:
successful completion of all classroom sessions
minimum 100 hours of live work each for everyone undergoing 3 months transition and minimum 75 hours of work each for those with 2 months transition.

Achievement towards these criteria will be measured and monitored through periodical reviews as explained in the section below.

1.8 Transition Schedule

The overall transition schedule is available in a separate controlled document, 'Staff Transition Schedule'. The training schedule is available in the 'Training Plan'.

1.9 Status Reviews and Reporting

| Review | Participants | Responsible (for arranging) | Reporting/Deliverable |
|--------|--------------|----------------------------|------------------------|
| Weekly review of transition progress | in-house transition manager, project managers, vendor manager(s) | Transition manager | Minutes of the meeting |
| Monthly review of IGSI each staff | Transition management team | Transition manager | Review report |
| Transition completion review for each vendor staff | Transition management team (or representatives), respective project manager(s) | vendor project manager | Final review checklist signoff |
| vendor team meeting | vendor project manager, vendor team | vendor project manager | Minutes, verbal feedback |
| in-house staff meetings | Transition manager, in-house project managers, current team | transition manager | Minutes, verbal feedback |

1.10 Risk Factors and Mitigation Plans

| Risk factor | Mitigation Plan |
|-------------|-----------------|
| Inadequate platform skills | Gap analysis done and extensive training provided prior to the transition |
| Loss of years of application skills due to transfer of work | Key staff with critical skills will be retained for longer durations on the project before moving out |
| Insufficient transfer of skills to vendor staff (during transition) | Formal periodical and end of transition reviews with each staff Each vendor staff to make presentation to current staff on knowledge gained Formal checklist will be used to sign off transition of each staff |
| Attention of vendor staff immediately after skills transfer | Incentive plans to ensure retention Adequate backup plans, cross training |
| Non cooperation (or inadequate cooperation) of in-house staff during transition | Project-end incentive plans, rewards and recognition Counselling prior to transition to ensure good (and visible) career path |
| Non cooperation of current contract staff during transition | Agreements secured with contracting company at an organisation level |
| Inadequate/poor communication during transition period leads to incorrect rumours resulting in low employee morale | Transparency in staff issues during transition Transition newsletter and other similar management communication cascading correct information. |

1.11 Roles & Responsibilities

Following definitions pertain to transition phase only. Definitions of roles for the post transition phase will be included in the Support Control Plan document which will be prepared by the end of the transition phase.

a) In-House Project Executive
  Participate in management review meetings, as scheduled
  Resolve or facilitate the resolution of issues, as appropriate.
  Be the highest level on the escalation path for issues related to the Financials and Planned Deliverables
b) In-House Project Manager(s)
  Assume business responsibility for the Financials and Plan Deliverables for the transition
  Assign and track work deliverables
  Participate in the selection of the vendor resources
  Assist the Transition Manager in defining the Training Plan and the Transition Plan at the individual level, and in reviewing the transition progress.
  Work closely with the vendor project manager(s) to ensure there is consistent and seamless transfer of workload between the remote and in-house teams
  Participate in status reviews, as appropriate
  Resolve or facilitate the resolution of issues, as appropriate.
  Be on the escalation path for issues related to the transition.
  Foster a team spirit between the vendor and current employees
c) Transition Manager
  Be the focal point between the vendor and in-house project teams
  Assume responsibility for the skills transfer
  Participate in the selection of the vendor resources.
  Define the Training Plan and the Transition Plan by function.
  Ensure all documents are in place, including DOUs, Plans, Billing Processing, Status Reporting and meeting minutes.
  Own the above documents
  Set up and participate in status reviews, as appropriate, with in-house management, vendor management and customer/end-user
  Facilitate the resolution of issues, as appropriate.
  Be the focal point for all activities related to the billing and the Financials.
  Be an advisor and guide to the project management team.
  Ensure there is effective communication across all teams involved in transition
  Foster a team spirit between the vendor and current employees
d) HR Representative
  Be the focal point for all personnel related issues and activities including keeping morale high among the teams members.
  Be responsible for ensuring people stay on the transition as needed.
  Ensure employees receive the appropriate education, as needed.
  Work in partnership with the project managers to place regular employees coming off the project.
  Be the focal point for activities related to the office and equipment planning.
  Participate in the selection of the vendor resources.
e) Vendor Project Manager
  Be the single point of contact between the two teams and therefore serve as a facilitator for the smooth flow of information between the two sides
  Organize monthly and end of transition reviews for the vendor staff
  Participate in weekly transition progress reviews with the customer
  Be a mentor, advisor and guide to the vendor on-site team—both from the professional and personal perspectives
  Foster a team spirit within the vendor team such that the work environment is conducive to high levels of employee satisfaction thereby resulting in increased productivity and cost benefits to the customer
  Prepare the Support Control Plan (SCP) which will define the post-transition support process

EXAMPLE IV

Sample Support Control Plan
1.1 Overview
1.1.1 Project Objectives
  This document outlines the support control plan for the XYZ applications. It contains the:
  scope of work and the terminology used
  various activities involved in the support process, the order in which they should be carried out and the deliverables arising from the important phases/milestones
  work/support environment
  quality measurements and performance criteria
  project management process
  contact names and numbers of key personnel.
1.1.2 Problem Definition
  A problem is a defect in the application suite, identified by the user who could be a tester, developer or an end-user of the system. Once reported, every problem has a severity level—indicative of the impact on the business—assigned to it. Severity levels can be from 1 to 4—smaller the number, greater the impact on the business process and therefore, more urgent its resolution. Additional information is provided in the section, Performance Evaluation Measures.
1.1.3 Work Environment
Applications reside on:
  User id
  Production regions
  Development region
1.2 Roles and Responsibilities
  The roles and responsibilities of the people, from the support perspective are given below:

| Activity | Primary Responsibility |
| --- | --- |
| Interface with customer and accepting SRs on behalf of the team | Technical Lead |
| Interface with customer and accepting Owner Support/Customer assist/queries etc. | Technical Lead |
| Co-ordinating with customer on Prioritisation of work | Technical Lead |
| Work allocation, tracking and status monitoring | Technical Lead |
| Co-ordinating sizing effort and sizing review process for support contact person | vendor Technical Lead |
| Building up backup resources within remote staff | vendor Technical Lead |
| Build up and monitor a review process to ensure quality of service provided by remote | vendor Technical Lead |
| Reporting status of the work allocated to remote team | vendor Technical Lead will report status to PM and Technical Lead |

-continued

| Activity | Primary Responsibility |
| --- | --- |
| Skill development of vendor staff (Application knowledge, Technical skills, communication skills) | vendor Technical Lead |
| Staffing plan updates | Project manager, vendor project manager |
| Tracking of actuals | |
| Changes in Plan | |
| Maintain SR history and metrics collection | Vendor Technical Lead |
| Code promotion activities | Support Contact person |
| SEI CMM related activities | Team |

1.3 Problem Reporting

All problems and enhancement requests that require work to be done by the vendor/remote support will be clearly documented in the support database. Similarly the support team will update this database with the latest status of work being carried out. This database will be the primary means of communication between the end-user/customer and the support team with respect to the work being carried out. However, this does not preclude the use of other forms of communication (i.e., e-mail, phone), especially if the database is unavailable or cannot be accessed.

1.4 Support Hours

| Days | Remote Time | US Time (EST) | US Time (EDT) |
| --- | --- | --- | --- |
| Monday–Friday | 9:00 AM to 6:00 PM | 10:30 PM to 7:30 AM | 11:30 PM to 8:30 AM |
| Saturday, Sunday and holidays common to vendor and customer | By prior arrangement only. 4 weeks notice required | By prior arrangement only. 4 weeks notice required | By prior arrangement only. 4 weeks notice required |
| vendor holidays and holidays common to both vendor and customer | On call pager support | On call pager support | On call pager support |
| Customer holidays | 9:00 AM to 6:00 PM | 10:30 PM to 7:30 AM | 11:30 PM to 8:30 AM |

On call support is provided on all the days for severity 1 problem to ensure that the resolution is provided within the turnaround time shown in the section, Quality Objectives.

1.5 Documentation
1.5.1 Document References
1.5.2 Distribution List
1.6 Call Management The on-call recovery database gives the names of the persons and their contact numbers. The Customer Project Manager will ensure these numbers are on on-call.

He/She will also ensure the Vendor holiday list is available on-line.

One of the backup numbers that will be in the on-call database will be the vendor help desk phone number: 1 234 567 9012. The person answering the call will ask for problem details and the person to be contacted.

The local support person (if any) is required to respond to calls within 20 minutes while the remote support person is required to respond within 60 minutes through either a home terminal, phone call or coming into work.

In the event of a telephone communication problem or the support person not being able to respond to within the agreed upon response time, the customer project manager will escalate using the normal escalation channels.

1.7 Quality Plan
1.7.1 Quality Objectives

All deliverables to customer to be delivered on schedule and to meet or exceed agreed levels of service. Quality measures are:

| Problem Severity | Description | Turnaround time |
| --- | --- | --- |

1.7.2 Verification and Validation

The Verification and Validation (V&V) process will ensure that development standards, procedures and methods are enforced at all levels; compliance by the support team will be mandatory.

Checkpoint 1: Every code change, however trivial, will be preceded by an analysis and specification stage culminating, in the case of enhancements, in the preparation of detailed program specifications and test criteria.

Checkpoint 2: Test criteria and their results will be fully documented.

Checkpoint 3: Release of deliverables will be followed by adequate archiving of all related documentation and source/object codes to enable future audit trace ability. It should be noted that in the case of severity 1 problems, where the focus is on fixing the error in order to bring the application up, the analysis document may be bypassed until the Severity 1 is resolved.

1.8 Performance Evaluation Measures
1.8.1 Service Levels

The problem resolution time will depend on the nature of the error, its priority, the level of diagnostic evidence provided and the current workload of the support team.

The turnaround time, for each of the Severity calls are given in the section, Quality Objectives.

Unless specified otherwise, these times will be measured from the actual time of receipt of the error, by the remote support team. This is based on the assumption that there is not much of a time gap between the time the end-user logs the call and vendor acknowledging it. This will be reviewed if there is a substantial difference between the two times.

Turnaround times are very much dependent on other external factors such as complexity of the problem, impact of the solution on other application areas and prioritisation with respect to other errors/problems of similar or greater severity. In any case, the originator of the problem will be informed accordingly.

It is assumed that for severity 1 errors, the support team will have access to a single point of contact for clarifications to help them close the error as quickly as possible.

1.9 Process Flow

Maintenance: the flowchart in FIG. 3a shows that in the case of Severity 1, the code will be promoted to production set-up without system testing by the AO. In the case of Severity 2 through 4, the code will be promoted after the system testing, as given in the flow chart. Similarly FIG. 3b shows the Enhancements flow.

1.9.3 Configuration Management

Configuration management will be handled as documented in the project control book.

1.9.4 Exception Conditions

The processes defined above should be sufficient for the normal day-to-day functioning of the support team. However, certain situations could arise which might require that certain steps or indeed the whole process needs to be bypassed to ensure early resolution of the problem in order that the impact to business is minimal. Several such cases are described below.

a) Rescheduling

Whilst the remote support team will attempt to maintain (or better) the agreed service levels, it is possible that unanticipated surges in reported problems could stretch its capacity. Under these circumstances, the customer and vendor project managers will re-prioritise the errors and reschedule target clearance dates.

b) Code Not Accessible

The remote team will contact the vendor manager who will escalate the problem with the support authority to find out the cause and resolve the issue.

c) SR Database not Accessible

If the SR database is not available to the remote team, then the vendor manager will be contacted immediately and he/she will act as the co-ordinator to ensure that the relevant details are retrieved/updated as required.

d) E-Mail not Accessible

Telephones will be used until the problem is resolved. The vendor manager will be contacted immediately to keep the customer informed of the situation and the progress.

e) Force Majeure Conditions at Remote Location

If the remote support team is not able to function because of an emergency such as the office being closed, natural calamities, civil commotion/unrest or a breakdown in communication links, where the duration of the outage is not known, the problem will be escalated immediately to the customer project managers and appropriate action taken.

f) Default Plan

Should a situation arise that is not covered by the above solutions, then the remote project will contact the vendor manager and the vendor project manager to decide an appropriate way out. The agreed solution will be documented by the vendor manager and copied to the in-house project manager, vendor management representative and the remote project manager.

Project Management

1.9.1 Timesheets & Billing

1.9.2 Project Review And Reporting:
Sample graphs titled 'Monitoring Progress' are given in FIGS. 4 to 16. While FIGS. 4, 5a, 5b and 6 refer to graphs dealing with progress during transition stage, FIGS. 7 to 16 deal with the various problem summaries arising during the steady state.

1.10.1 Escalation Path

1.10.2 Team Contact Details

| Role | Name (Optional) | Contact Number | E-mail id |
|------|-----------------|----------------|-----------|

1.11 Vendor Holidays 1.12 Customer Holidays

| SAMPLE WEEKLY REVIEW | | |
|---|---|---|
| Appln. | Progress/Issues/Concerns | Actions/Responsibility |
| EDIOPS | RP: Continues to do well. He will train a summer student to stand in for him during his time away at customer site<br>YK: On schedule. Has worked extra time (10 hrs) over weekend on rel 1 support.<br>HG: Extremely good in OO design. Providing valuable assistance to YK<br>VS scheduled to start either on Friday (29 May) or Monday<br>Because of the tight project schedule, CH requested that vacations are deferred at least until 15 July<br>Home terminals for vendor people | SS |
| ETS | Gateway transition ahead of schedule<br>PS presentations going well. Clarifications in Direct Debit and ECP. EPO was fine | |
| CIS | On schedule. | |

| A. SAMPLE STAFF BACKUP PLAN | | | | | |
|---|---|---|---|---|---|
| Name | Appln | Loc | Impact Assessment | Risk Probability | Backup Identified |
| PQR | ABC | | Impact: "High"<br>Reasons:<br>This person has been a good performer in the team.<br>He has gained a good knowledge of the application.<br>His proximity to the end customer has made them comfortable about him | Probability: "High".<br>Reasons:<br>This person very frequently asks for undue favors | Following people have been with the team for more than 15 months and are recognized as good performers One of them can take over the work done if required:<br>A<br>B<br>C |

SAMPLE WEEKLY REVIEW

| | | | | |
|---|---|---|---|---|
| STU | ABC | Impact: High<br>Reasons:<br>A good performer<br>Has good knowledge of the application | Probability: "Medium"<br>Reason:<br>Has location constraints | B has been in the same application for more than 15 months and can take stand-in for 123 |
| LMN | ABC | Impact: High<br>Reasons:<br>Is a very good performer<br>Has the capability of giving technical leadership to the team.<br>Has a very good knowledge of the applications | Probability: "Low"<br>Reason:<br>Feels the company brand name is important<br>Has expressed his wish to grow in the company. | Following people have been with the SBL team for more than 15 months and are recognized as good performers. One of them can take over the work done by LMN<br>D<br>E |

What is claimed is:

1. A method for transferring a software application producing activity from a first physical location to a second physical location, wherein the software application producing activity includes developing or changing a software application and the software application operates on a certain platform, such a platform including a computer system and an operating system, wherein the changing includes enhancing an existing software application in order to maintain the software application or migrating an existing software application from a first platform to the certain platform, the method comprising the steps of:

assessing suitability of outsourcing, including selecting among N locations, including at least an on-site location, a location local to the on-site location and a location remote from the on-site location, wherein it is determined whether the software application producing activity should be carried out at the first physical location or at the second physical location, and whether the second physical location should be the location local to the on-site location or the location remote from the on-site location;

planning a process for the transferring of the software application producing activity including the steps of:
identifying milestones in the process for the transferring of the software application producing activity; and
identifying deliverables in each of the milestones;

transferring the software application producing activity from the first physical location to the second physical location if the assessing indicates outsourcing is suitable, wherein the transferring of the software application producing activity is performed after the step of planning the process for the transferring of the software application producing activity;

producing a newly developed or changed software application, wherein the software application operates on a certain platform, such a platform including a computer system and an operating system, wherein the producing of the changed software application includes enhancing an existing software application in order to maintain the software application or migrating an existing software application from a first platform to the certain platform;

monitoring progress of the transferring step compared to the planned transferring process; and evaluating the newly developed or changed software application;

wherein the assessing of suitability of outsourcing includes:
establishing for each of M selection parameters, a minimum score limit and a maximum score limit for each respective one of the N locations, thereby yielding N×M selection parameter minimum score limits and N×M selection parameter maximum score limits;

establishing a weighting factor for each of the M selection parameters;

assigning each of the M selection parameters a score within the established limits for each respective one of the N locations, thereby yielding N×M selection parameter scores;

calculating N normalized scores for the respective N locations, including:
computing weighted values for the N×M scores, including:
multiplying the N scores for each of the M selection parameters by each selection parameter's corresponding one of the M weighting factors, thereby yielding M weighted values for each of the N locations; and
setting the normalized scores to the respective sums of the M weighted values for the respective N locations:

wherein the selecting among the N locations is responsive to the N normalized scores for the respective N locations, wherein the establishing of the minimum and maximum score limits and the weighting factors includes establishing the limits and the weighting factors such that a maximum possible normalized score for one of the N locations may exceed a minimum possible normalized score for another one of the N locations, and wherein if the normalized score for a first one of the locations does exceed the minimum possible score for a second one of the locations then this indicates part of the software application producing activity should be carried out at the first one of the locations and part of the software application producing activity should be carried out at the second one of the locations.

2. A method as claimed in claim 1 wherein said developing of a software application comprises:
evaluating requirements in respect of:
structured interviews with the staff of the organization
system interface, and
cost/benefit analysis and project objectives
analyzing the requirements using:
logical data model
process model function prototyping, and
project plans and standards
developing a high level system design including:
  type of hardware used
  data dictionary required
  type of operating system (OS)
  system interface, and
  type of application software or user interface
developing a low level system design, including
  physical database,
  module specifications, and
  sub-programs and test plans
developing a specifications for the software application
  including specifications for program code,
  verification and validation of the test data, and
  link and system test
performing acceptance testing of the software application
  using verification test for functional interface verification, stress test and performance test, and
documenting the software application and user training after acceptance.

3. A method as claimed in claim 1 wherein said conversion from existing project system to new project system comprising:
  analyzing the requirements by
    defining source and target environment
    analyzing data structure
    analyzing job steps, and
    defining strategy for conversion tools
    defining strategy for hardware and software variation including special interface and data and archive migration
    defining change and control process and incremental change mechanism
  developing pilot project by:
    selection of pilot program
    generating test data for pilot program
    conducting pilot reference runs
    verifying reference runs results, and,
    updating conversion guide
  generating test data by:
    finalizing test data points
    freezing and archiving production code
    generating test data using reference runs, and
    verifying reference run results
    converting existing system to new system by:
    converting of common routines
    converting of source codes
    converting of job control units, and
    verifying and validating unit tests
    comparing results with test data
    defining data migration programs
  acceptance of new system by
    verifying functional equivalence
    verifying interfaces
    conducting stress tests
    conducting performance test
    verifying data migration programs
  post acceptance phase including
    user training
    defining cutover strategy
    implementing incremental changes
    data transfer
    conducting parallel runs, and
    implementing cutover.

4. A method as claimed in claim 1 wherein said maintenance of the existing project system comprises:
  planning
  project selection and formation of transition management team
  definition of the scope of the environment, service level agreements, backlog and team size
  definition of skills and levels, and
  preparation of staffing plan
  cost benefit analysis and business case
  skills gap analysis and incremental training
  professional counseling for displaced staff
  knowledge transfer
    overview, architecture, standards and procedures
    classroom training and updating of documentation
    documentation of project inventory
    assessment of team skills and tutor skills
    definition of support strategy and infrastructure
    identification team members and composition
  managed perform
    work on low priority errors/enhancements under close supervision
    assessing level and quality of skills transfer
    production maintenance and enhancement with management supervision
    definition of support procedures/processes and cutover strategy
    definition production and Quality Assessment measurement criteria
  assisted perform
    shared production support
    shifting of development work to remote location
    implementing new support strategy such as change control, call handling mechanism, end-user interfaces, communication channels and cutover
    checkpoint review with end user staff
  cutover & steady state
    transferring project management control
    optimising ADM processes
    identifying critical resources and develop backup staff plan
    optimising skills pool by cross training
    considering possible mission transfer.

5. The method of claim 1 wherein the application is for a server in a client/server system, the changing is for enhancing of the software application in order to maintain the software application and the step of producing of the changed software application includes the steps of:
  mirroring a server at a first location by a server at a second location, wherein the second location has the changed software application; and
  replicating data on the servers at the two locations according to a planned schedule.

6. The method of claim 1 wherein the selection parameters include:
  skill type,
  skill availability,
  project/application type,
  project position in life cycle,
  rapid application development and/or joint application development,
  clarity of scope,
  local third party involvement,
  project size,
  mission critical,
  miscellaneous constraints, and
  cost savings.

* * * * *